US012628836B2

(12) United States Patent
Blaine et al.

(10) Patent No.: US 12,628,836 B2
(45) Date of Patent: May 19, 2026

(54) SUB-PRIMAL CUT IDENTIFICATION AND PACKAGING OPTIMIZATION SYSTEM AND METHOD

(71) Applicant: JBT Marel Corporation, Chicago, IL (US)

(72) Inventors: George R. Blaine, Lake Stevens, WA (US); Richard D. Stockard, Kirkland, WA (US)

(73) Assignee: JBT Marel Corporation, Chicago, IL (US)

( * ) Notice: Subject to any disclaimer, the term of this patent is extended or adjusted under 35 U.S.C. 154(b) by 240 days.

(21) Appl. No.: 18/462,776

(22) Filed: Sep. 7, 2023

(65) Prior Publication Data

US 2024/0081355 A1 Mar. 14, 2024

Related U.S. Application Data

(60) Provisional application No. 63/375,215, filed on Sep. 9, 2022.

(51) Int. Cl.
*A22C 17/00* (2006.01)
*G06T 7/00* (2017.01)
(Continued)

(52) U.S. Cl.
CPC ........ *A22C 17/0086* (2013.01); *A22C 17/002* (2013.01); *A22C 17/0093* (2013.01);
(Continued)

(58) Field of Classification Search
None
See application file for complete search history.

(56) References Cited

U.S. PATENT DOCUMENTS

| 5,937,080 A | 8/1999 | Vogeley, Jr. et al. |
| 7,651,388 B2 | 1/2010 | Faires et al. |

(Continued)

FOREIGN PATENT DOCUMENTS

WO WO-2021022323 A1 * 2/2021 ............. G06V 40/10

OTHER PUBLICATIONS

Poonnoy, P., Yodkeaw, P., Sriwai, A., Umongkol, P., & Intamoon, S. (2014). Classification of Boiled Shrimp's Shape Using Image Analysis and Artificial Neural Network Model. Journal of Food Process Engineering, 37(3), 257-263. https://doi.org/10.1111/jfpe. 12081 (Year: 2014).*

(Continued)

*Primary Examiner* — Amandeep Saini
*Assistant Examiner* — Caroline Tabancay Duffy
(74) *Attorney, Agent, or Firm* — Christensen O'Connor Johnson Kindness PLLC

(57) ABSTRACT

A method carried out by a computing device may include: receiving a plurality of models each associated with a type of sub-primal cut, including a reference shape(s) for detection of a corresponding match characteristic by a corresponding scan type, and including a plurality of attribute characteristic value ranges; receiving a registered scan of a sub-primal cut including scans showing corresponding match characteristics; identifying attribute characteristics for the sub-primal cut using the registered scan; concurrently aligning reference shape(s) of each model to corresponding match characteristics and calculating a shape match values based on the alignment; determining a best model match for the registered scan using a plurality of attribute match values calculate based on the identified attribute characteristics compared to the attribute characteristic value ranges and the plurality of shape match values; and assigning a type of sub-primal cut to the sub-primal cut based on the best model match.

20 Claims, 21 Drawing Sheets

(51) Int. Cl.
    *G06T 7/30*           (2017.01)
    *G06T 7/50*           (2017.01)

(52) U.S. Cl.
    CPC .............. *G06T 7/0004* (2013.01); *G06T 7/30*
        (2017.01); *G06T 7/50* (2017.01); *G06T*
        *2207/10116* (2013.01); *G06T 2207/20081*
        (2013.01); *G06T 2207/30128* (2013.01)

(56) References Cited

U.S. PATENT DOCUMENTS

| | | | |
|---|---|---|---|
| 7,672,752 B2 | 3/2010 | Blaine et al. | |
| 8,688,267 B2 | 4/2014 | Blaine et al. | |
| 10,654,185 B2 | 5/2020 | Blaine et al. | |
| 11,337,432 B1 * | 5/2022 | Tao ...................... | A22C 29/025 |
| 11,570,998 B2 | 2/2023 | Pfanstiel et al. | |
| 2008/0144880 A1 * | 6/2008 | DeLuca .................... | G06T 7/20 |
| | | | 382/100 |
| 2012/0018353 A1 * | 1/2012 | McKenna ............... | A23L 13/00 |
| | | | 209/10 |
| 2020/0288729 A1 * | 9/2020 | Blaine ................ | A22C 17/0073 |
| 2021/0204553 A1 * | 7/2021 | Mehta .................... | G06V 10/82 |
| 2021/0227840 A1 | 7/2021 | Blaine | |

OTHER PUBLICATIONS

International Search Report and Written Opinion mailed Dec. 14, 2023, issued in corresponding International Patent Application PCT/US2023/073640, filed Sep. 7, 2023, 18 pages.

Zhu, L., et al., "Deep Learning and Machine Vision for Food Processing: A Survey," Current Research in Food Science 4(3):233-249, Apr. 2021.

\* cited by examiner

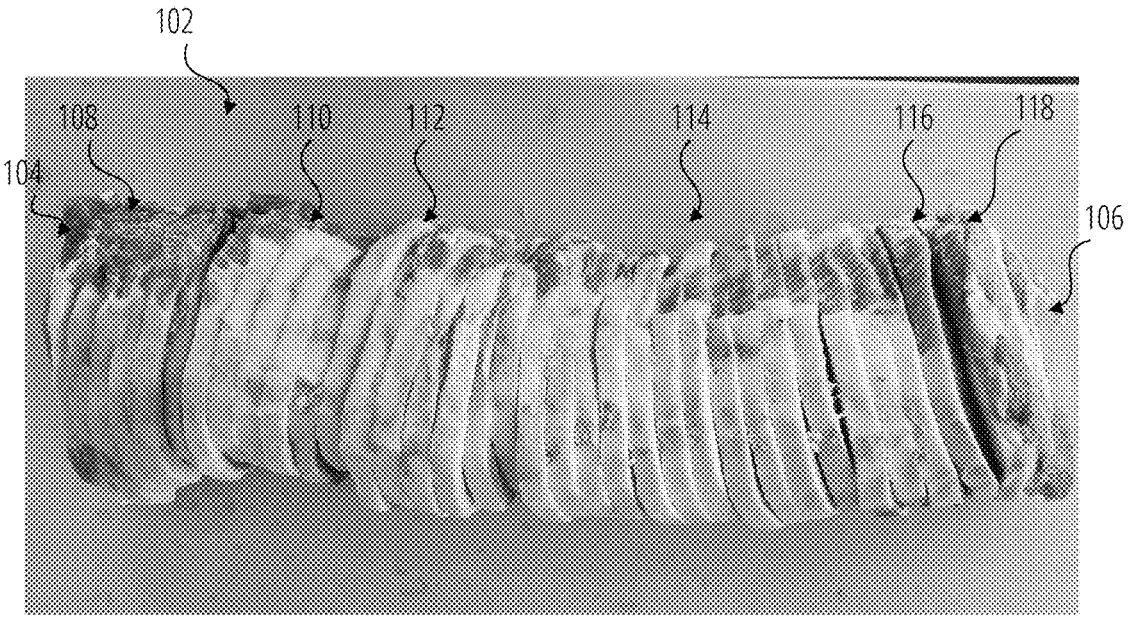
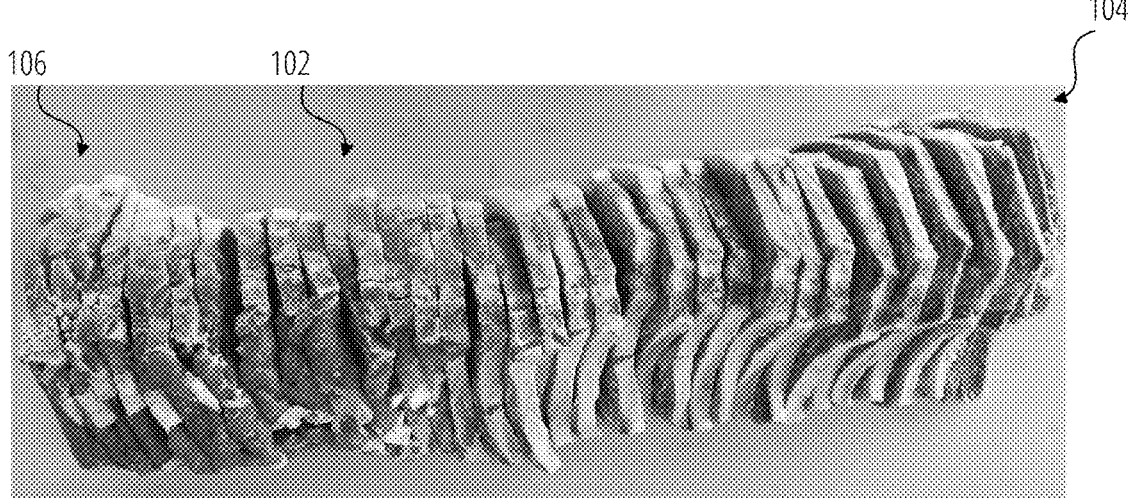
FIG. 1

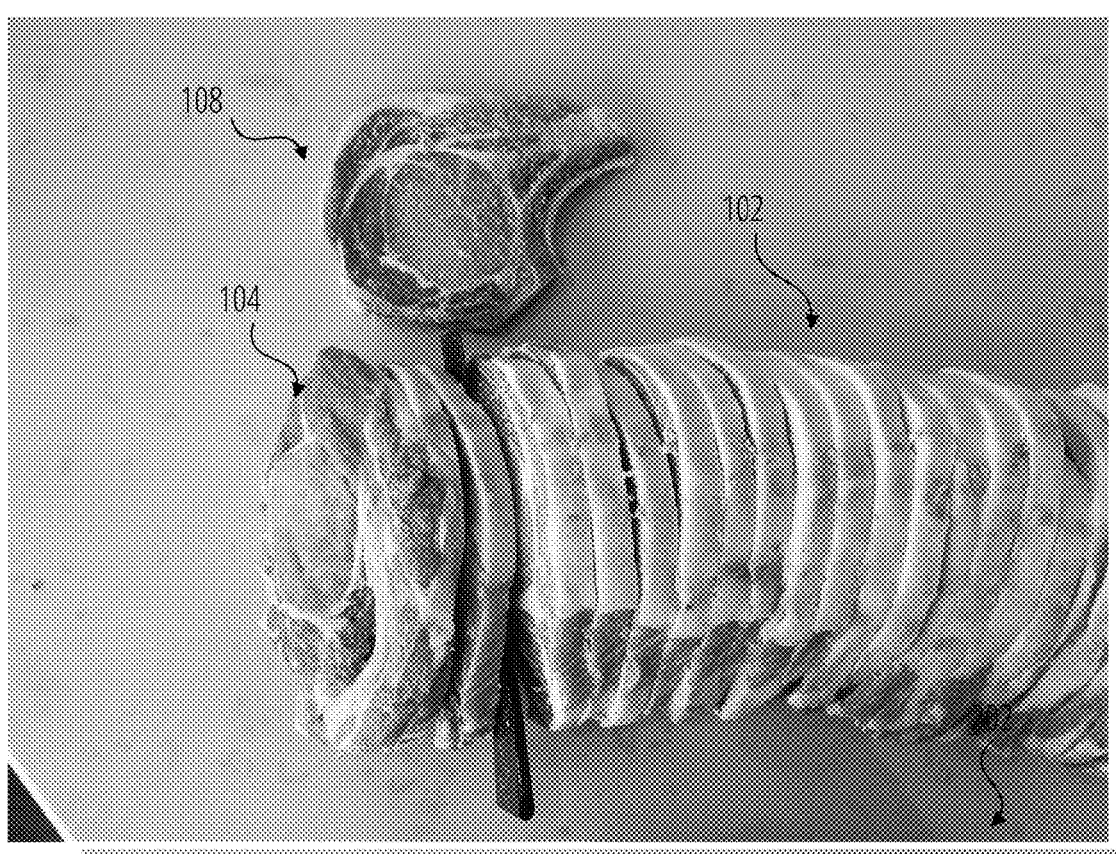
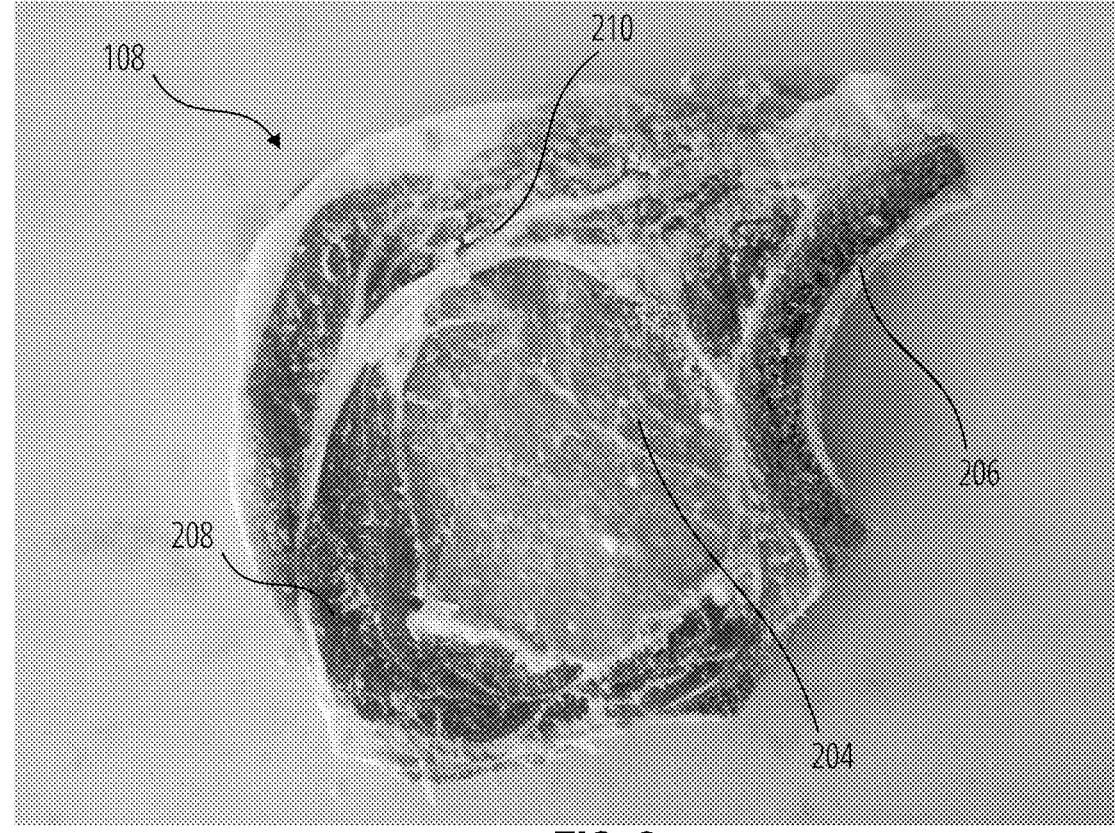
FIG. 2

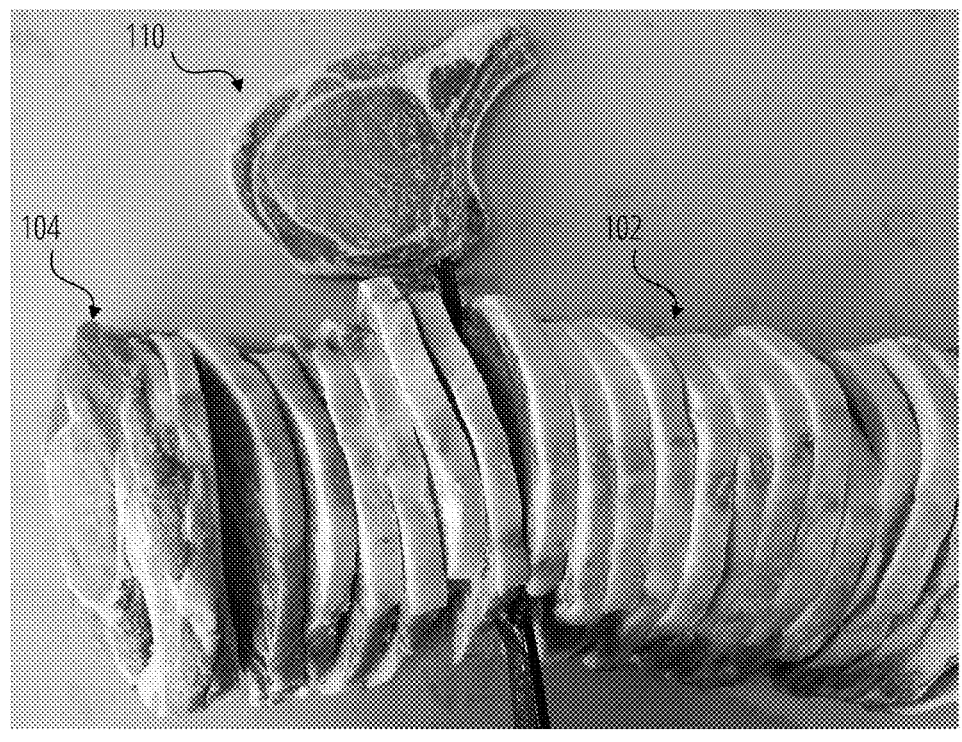
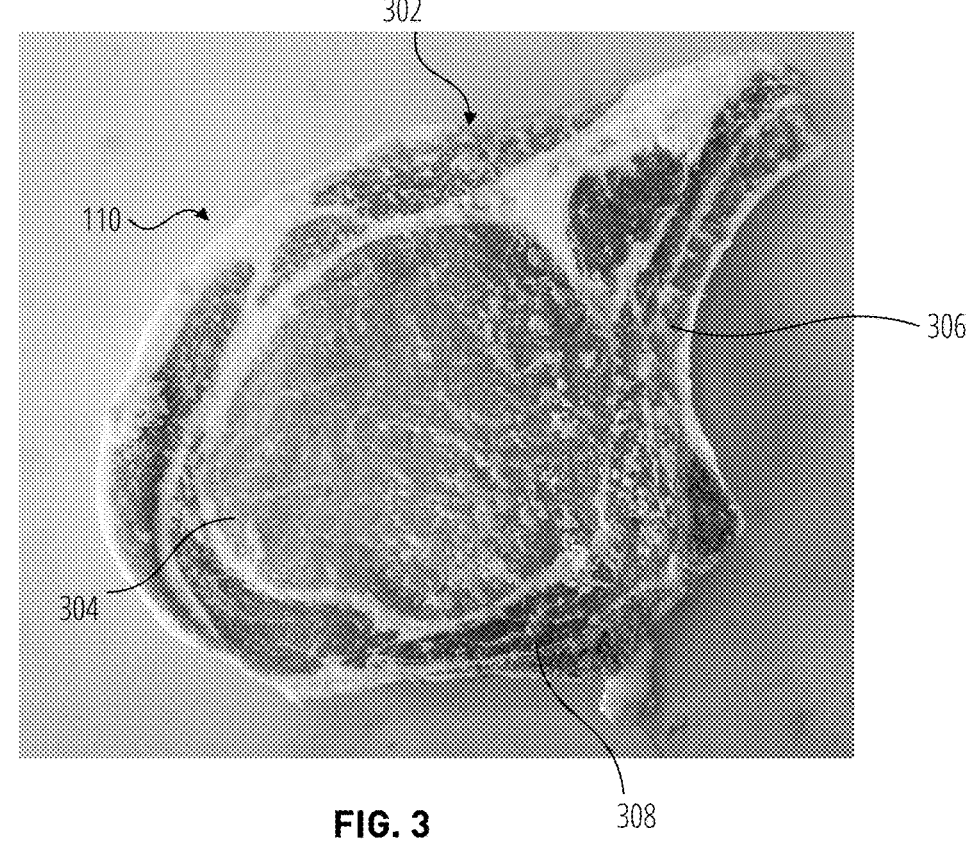
FIG. 3

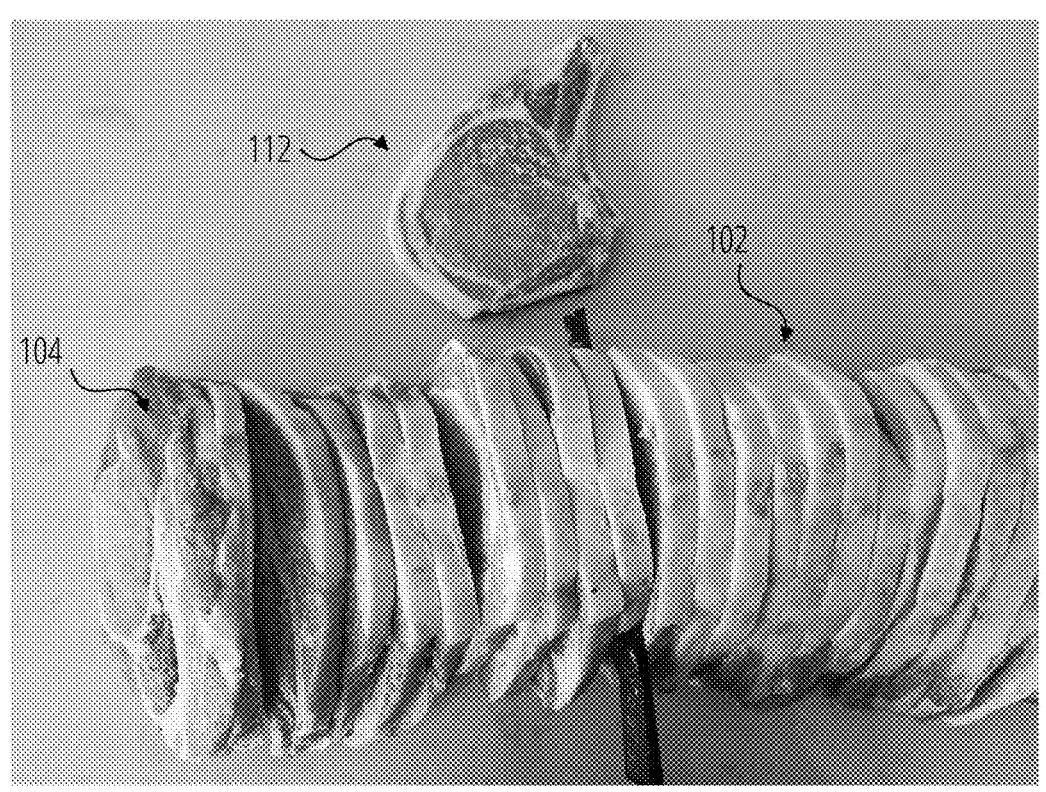
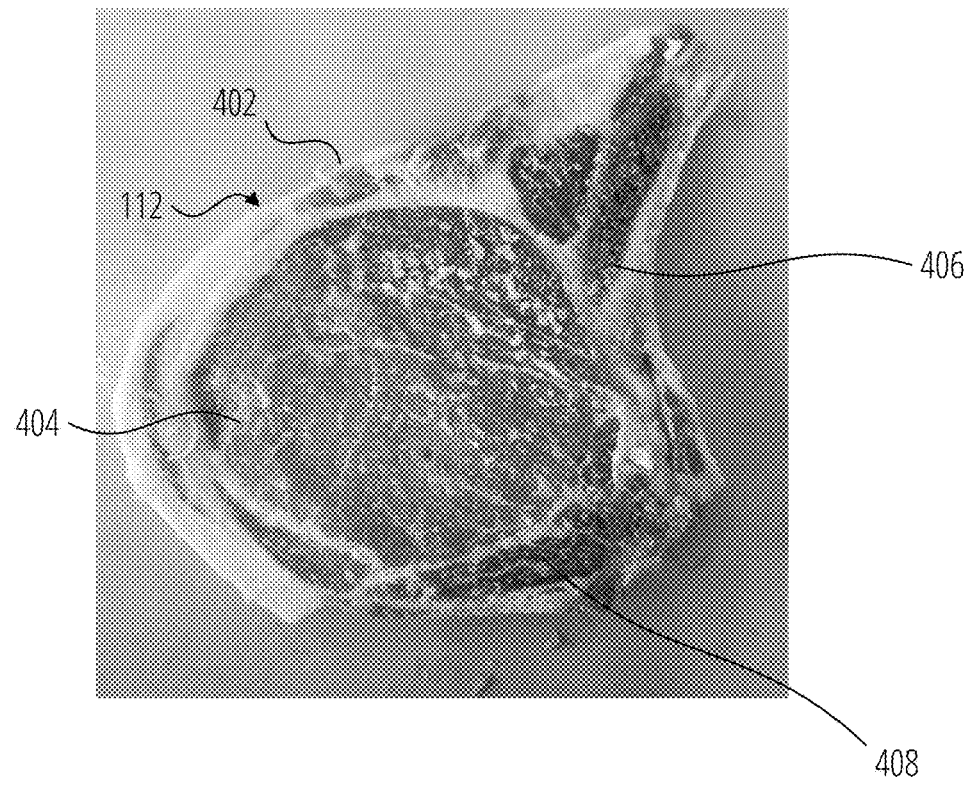
FIG. 4

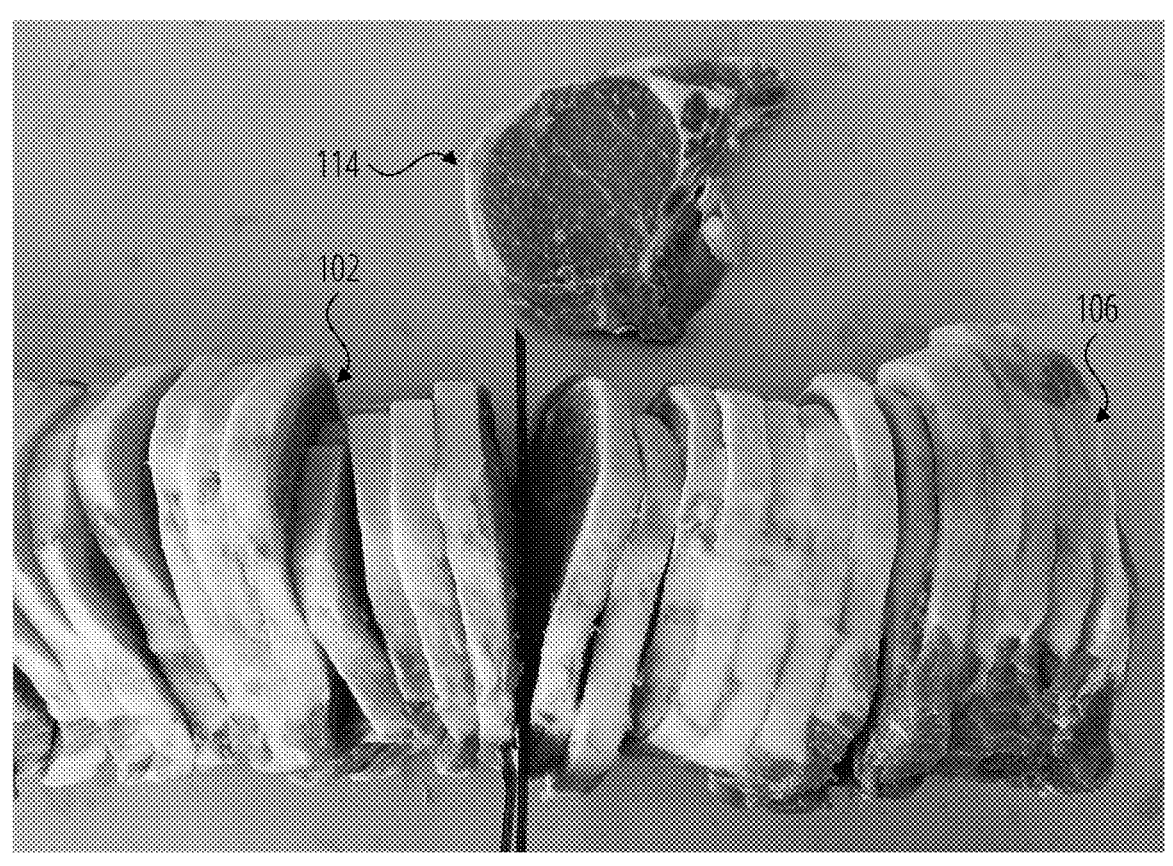
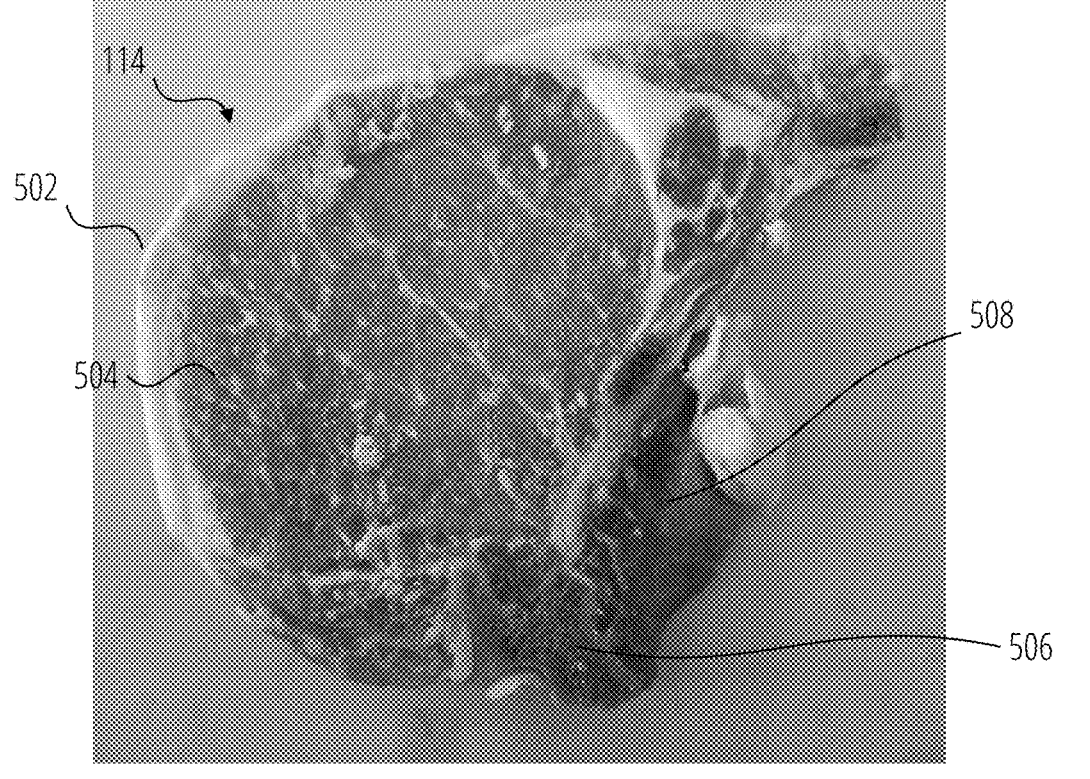
FIG. 5

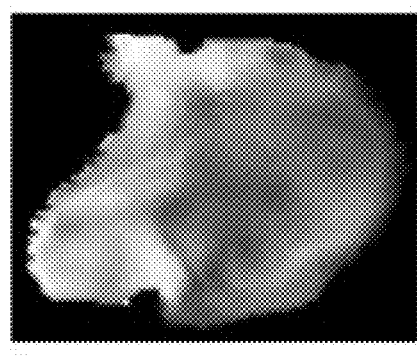
Height Mode
Object View
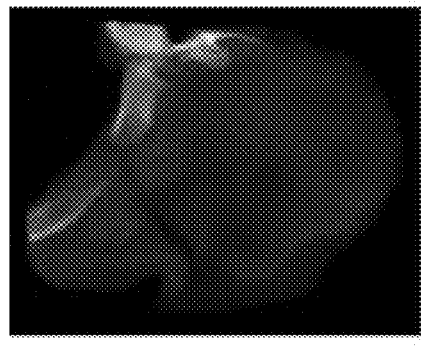
X-Ray Mode
Object View
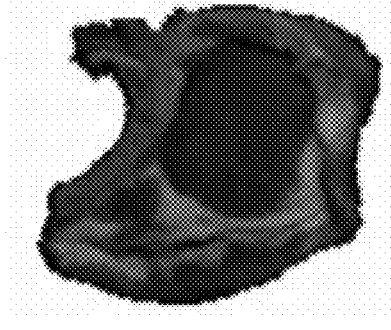
Laser Scatter
Object View
Normal FRS
Object View
FIG. 11A

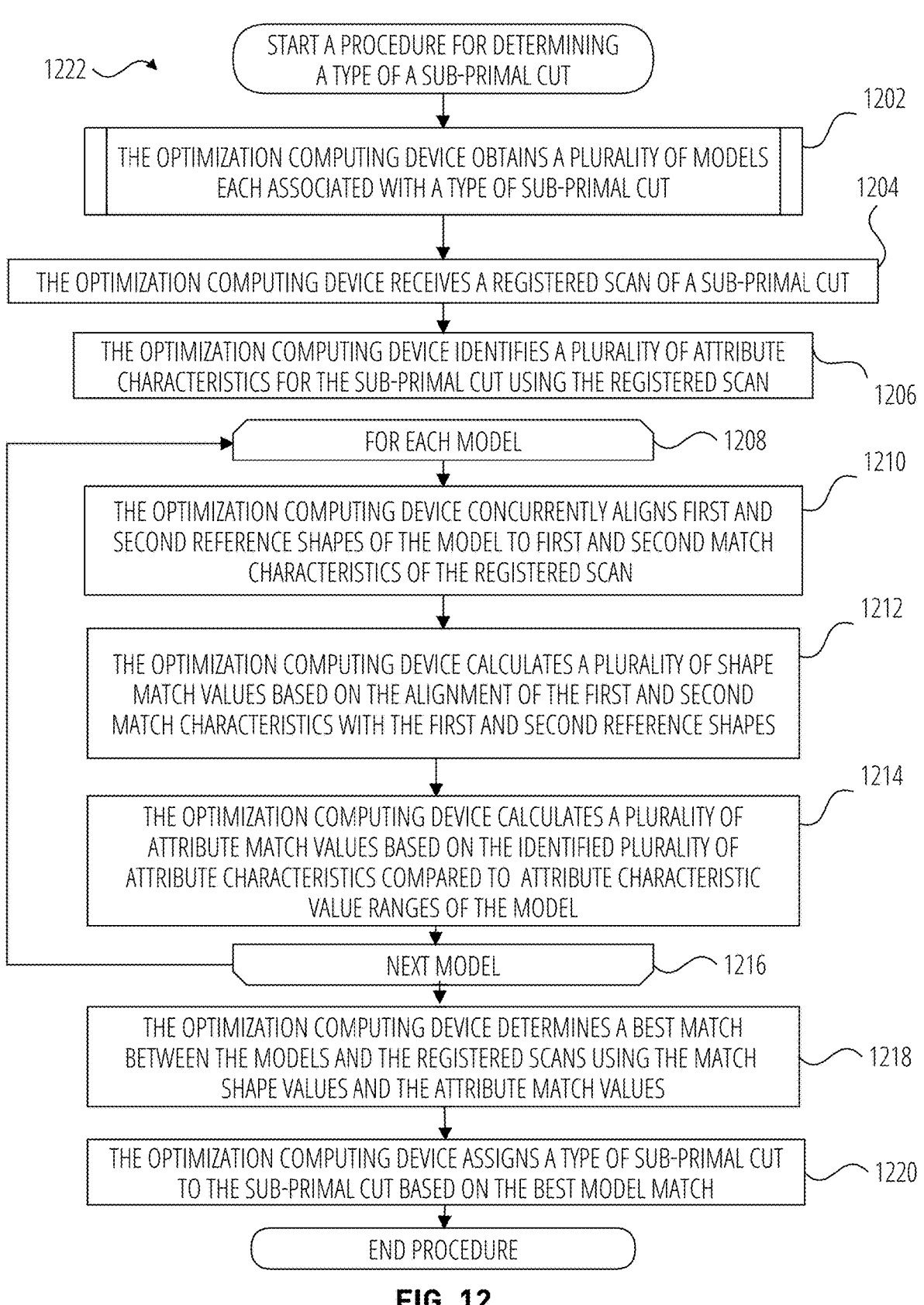

1222

START A PROCEDURE FOR DETERMINING
A TYPE OF A SUB-PRIMAL CUT

1202

THE OPTIMIZATION COMPUTING DEVICE OBTAINS A PLURALITY OF MODELS
EACH ASSOCIATED WITH A TYPE OF SUB-PRIMAL CUT

1204

THE OPTIMIZATION COMPUTING DEVICE RECEIVES A REGISTERED SCAN OF A SUB-PRIMAL CUT

THE OPTIMIZATION COMPUTING DEVICE IDENTIFIES A PLURALITY OF ATTRIBUTE
CHARACTERISTICS FOR THE SUB-PRIMAL CUT USING THE REGISTERED SCAN

1206

FOR EACH MODEL                    1208

1210

THE OPTIMIZATION COMPUTING DEVICE CONCURRENTLY ALIGNS FIRST AND
SECOND REFERENCE SHAPES OF THE MODEL TO FIRST AND SECOND MATCH
CHARACTERISTICS OF THE REGISTERED SCAN

1212

THE OPTIMIZATION COMPUTING DEVICE CALCULATES A PLURALITY OF SHAPE
MATCH VALUES BASED ON THE ALIGNMENT OF THE FIRST AND SECOND
MATCH CHARACTERISTICS WITH THE FIRST AND SECOND REFERENCE SHAPES

1214

THE OPTIMIZATION COMPUTING DEVICE CALCULATES A PLURALITY OF
ATTRIBUTE MATCH VALUES BASED ON THE IDENTIFIED PLURALITY OF
ATTRIBUTE CHARACTERISTICS COMPARED TO  ATTRIBUTE CHARACTERISTIC
VALUE RANGES OF THE MODEL

NEXT MODEL                    1216

THE OPTIMIZATION COMPUTING DEVICE DETERMINES A BEST MATCH
BETWEEN THE MODELS AND THE REGISTERED SCANS USING THE MATCH
SHAPE VALUES AND THE ATTRIBUTE MATCH VALUES

1218

THE OPTIMIZATION COMPUTING DEVICE ASSIGNS A TYPE OF SUB-PRIMAL CUT
TO THE SUB-PRIMAL CUT BASED ON THE BEST MODEL MATCH

1220

END PROCEDURE

FIG. 12

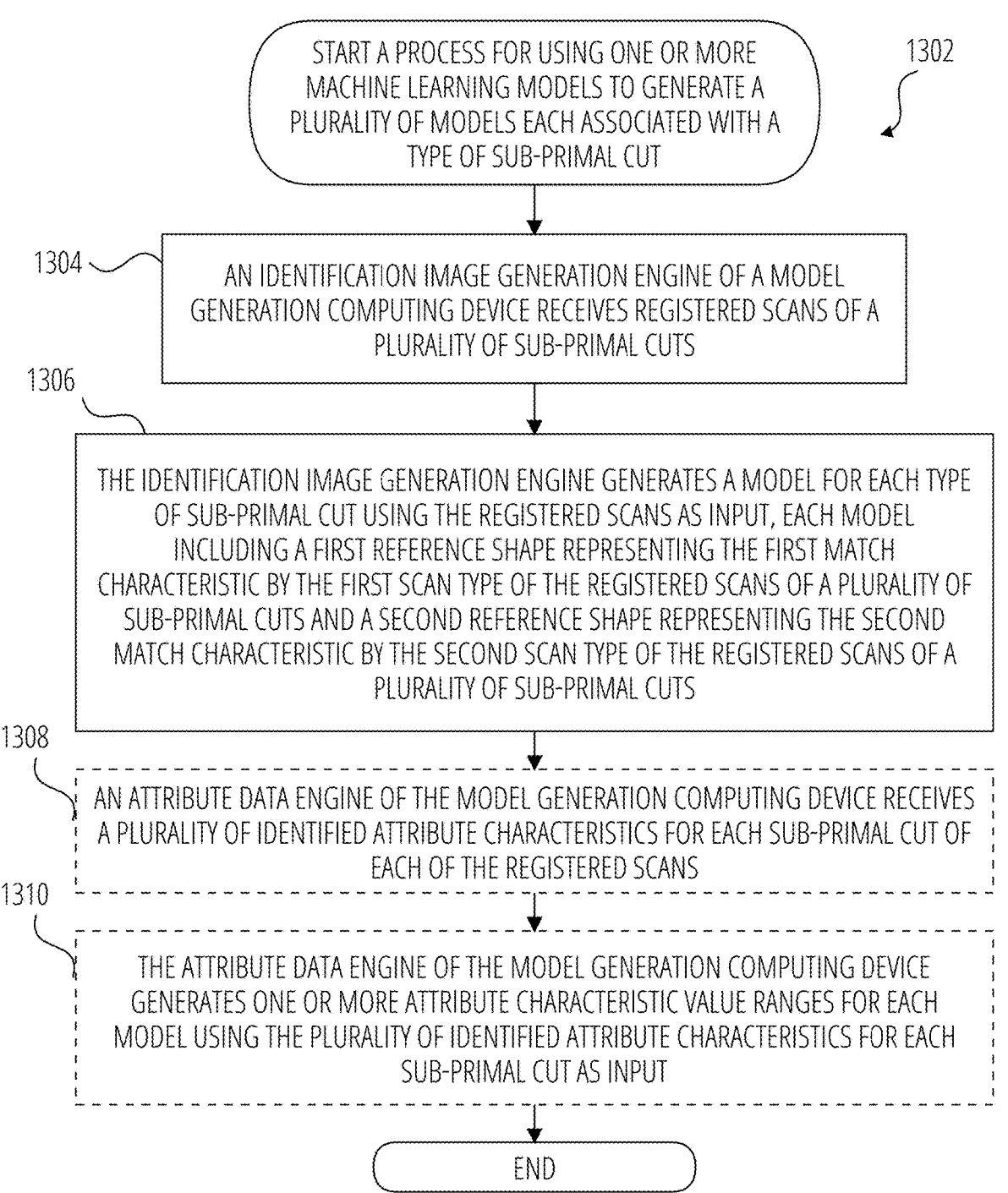

START A PROCESS FOR USING ONE OR MORE MACHINE LEARNING MODELS TO GENERATE A PLURALITY OF MODELS EACH ASSOCIATED WITH A TYPE OF SUB-PRIMAL CUT

1302

1304

AN IDENTIFICATION IMAGE GENERATION ENGINE OF A MODEL GENERATION COMPUTING DEVICE RECEIVES REGISTERED SCANS OF A PLURALITY OF SUB-PRIMAL CUTS

1306

THE IDENTIFICATION IMAGE GENERATION ENGINE GENERATES A MODEL FOR EACH TYPE OF SUB-PRIMAL CUT USING THE REGISTERED SCANS AS INPUT, EACH MODEL INCLUDING A FIRST REFERENCE SHAPE REPRESENTING THE FIRST MATCH CHARACTERISTIC BY THE FIRST SCAN TYPE OF THE REGISTERED SCANS OF A PLURALITY OF SUB-PRIMAL CUTS AND A SECOND REFERENCE SHAPE REPRESENTING THE SECOND MATCH CHARACTERISTIC BY THE SECOND SCAN TYPE OF THE REGISTERED SCANS OF A PLURALITY OF SUB-PRIMAL CUTS

1308

AN ATTRIBUTE DATA ENGINE OF THE MODEL GENERATION COMPUTING DEVICE RECEIVES A PLURALITY OF IDENTIFIED ATTRIBUTE CHARACTERISTICS FOR EACH SUB-PRIMAL CUT OF EACH OF THE REGISTERED SCANS

1310

THE ATTRIBUTE DATA ENGINE OF THE MODEL GENERATION COMPUTING DEVICE GENERATES ONE OR MORE ATTRIBUTE CHARACTERISTIC VALUE RANGES FOR EACH MODEL USING THE PLURALITY OF IDENTIFIED ATTRIBUTE CHARACTERISTICS FOR EACH SUB-PRIMAL CUT AS INPUT

END

FIG. 13

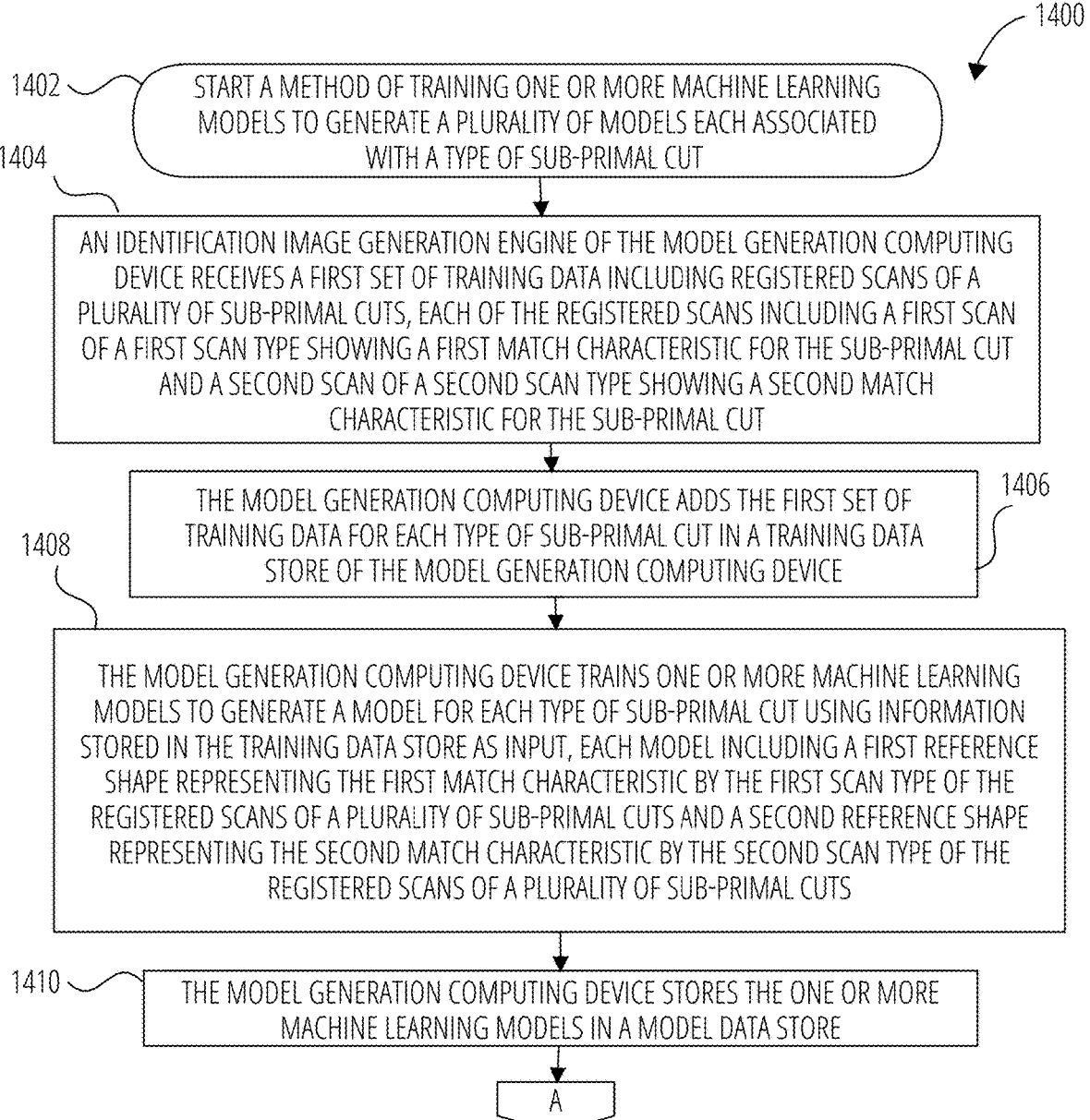

1400

1402 START A METHOD OF TRAINING ONE OR MORE MACHINE LEARNING MODELS TO GENERATE A PLURALITY OF MODELS EACH ASSOCIATED WITH A TYPE OF SUB-PRIMAL CUT

1404 AN IDENTIFICATION IMAGE GENERATION ENGINE OF THE MODEL GENERATION COMPUTING DEVICE RECEIVES A FIRST SET OF TRAINING DATA INCLUDING REGISTERED SCANS OF A PLURALITY OF SUB-PRIMAL CUTS, EACH OF THE REGISTERED SCANS INCLUDING A FIRST SCAN OF A FIRST SCAN TYPE SHOWING A FIRST MATCH CHARACTERISTIC FOR THE SUB-PRIMAL CUT AND A SECOND SCAN OF A SECOND SCAN TYPE SHOWING A SECOND MATCH CHARACTERISTIC FOR THE SUB-PRIMAL CUT

1406 THE MODEL GENERATION COMPUTING DEVICE ADDS THE FIRST SET OF TRAINING DATA FOR EACH TYPE OF SUB-PRIMAL CUT IN A TRAINING DATA STORE OF THE MODEL GENERATION COMPUTING DEVICE

1408 THE MODEL GENERATION COMPUTING DEVICE TRAINS ONE OR MORE MACHINE LEARNING MODELS TO GENERATE A MODEL FOR EACH TYPE OF SUB-PRIMAL CUT USING INFORMATION STORED IN THE TRAINING DATA STORE AS INPUT, EACH MODEL INCLUDING A FIRST REFERENCE SHAPE REPRESENTING THE FIRST MATCH CHARACTERISTIC BY THE FIRST SCAN TYPE OF THE REGISTERED SCANS OF A PLURALITY OF SUB-PRIMAL CUTS AND A SECOND REFERENCE SHAPE REPRESENTING THE SECOND MATCH CHARACTERISTIC BY THE SECOND SCAN TYPE OF THE REGISTERED SCANS OF A PLURALITY OF SUB-PRIMAL CUTS

1410 THE MODEL GENERATION COMPUTING DEVICE STORES THE ONE OR MORE MACHINE LEARNING MODELS IN A MODEL DATA STORE

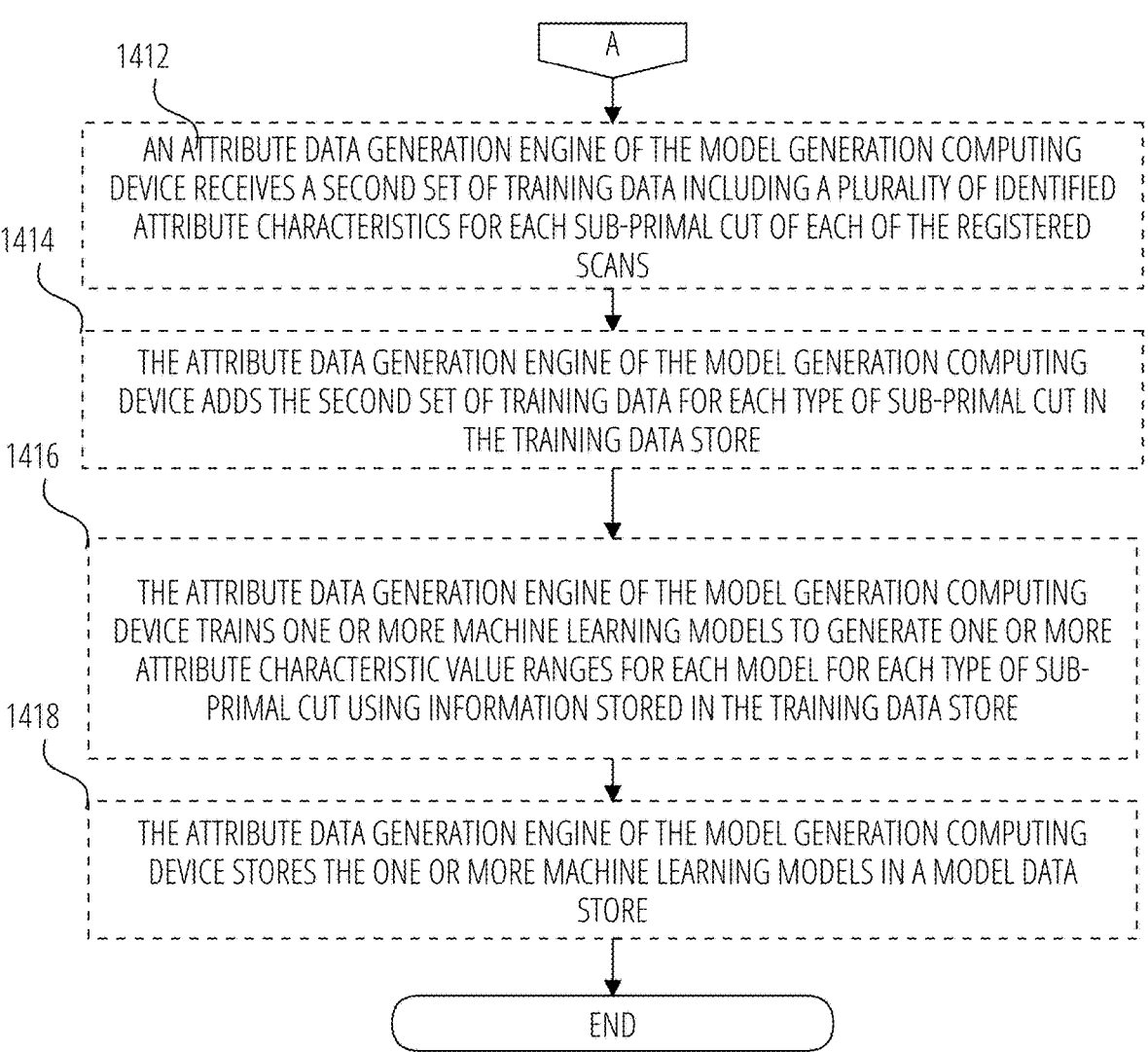

1412

A

1414

AN ATTRIBUTE DATA GENERATION ENGINE OF THE MODEL GENERATION COMPUTING DEVICE RECEIVES A SECOND SET OF TRAINING DATA INCLUDING A PLURALITY OF IDENTIFIED ATTRIBUTE CHARACTERISTICS FOR EACH SUB-PRIMAL CUT OF EACH OF THE REGISTERED SCANS

1416

THE ATTRIBUTE DATA GENERATION ENGINE OF THE MODEL GENERATION COMPUTING DEVICE ADDS THE SECOND SET OF TRAINING DATA FOR EACH TYPE OF SUB-PRIMAL CUT IN THE TRAINING DATA STORE

1418

THE ATTRIBUTE DATA GENERATION ENGINE OF THE MODEL GENERATION COMPUTING DEVICE TRAINS ONE OR MORE MACHINE LEARNING MODELS TO GENERATE ONE OR MORE ATTRIBUTE CHARACTERISTIC VALUE RANGES FOR EACH MODEL FOR EACH TYPE OF SUB-PRIMAL CUT USING INFORMATION STORED IN THE TRAINING DATA STORE

THE ATTRIBUTE DATA GENERATION ENGINE OF THE MODEL GENERATION COMPUTING DEVICE STORES THE ONE OR MORE MACHINE LEARNING MODELS IN A MODEL DATA STORE

END

FIG. 14B

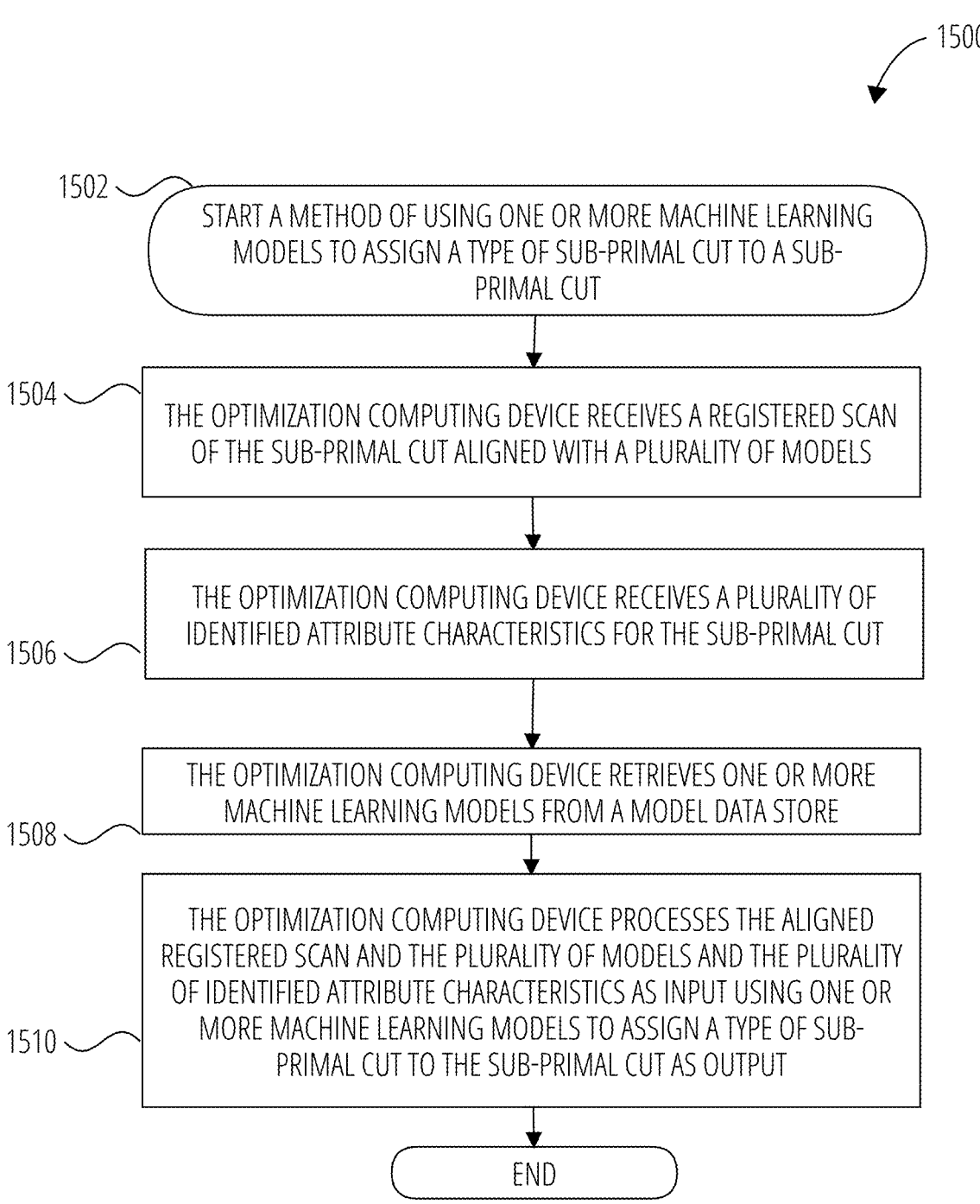

1500

1502 — START A METHOD OF USING ONE OR MORE MACHINE LEARNING MODELS TO ASSIGN A TYPE OF SUB-PRIMAL CUT TO A SUB-PRIMAL CUT

1504 — THE OPTIMIZATION COMPUTING DEVICE RECEIVES A REGISTERED SCAN OF THE SUB-PRIMAL CUT ALIGNED WITH A PLURALITY OF MODELS

1506 — THE OPTIMIZATION COMPUTING DEVICE RECEIVES A PLURALITY OF IDENTIFIED ATTRIBUTE CHARACTERISTICS FOR THE SUB-PRIMAL CUT

1508 — THE OPTIMIZATION COMPUTING DEVICE RETRIEVES ONE OR MORE MACHINE LEARNING MODELS FROM A MODEL DATA STORE

1510 — THE OPTIMIZATION COMPUTING DEVICE PROCESSES THE ALIGNED REGISTERED SCAN AND THE PLURALITY OF MODELS AND THE PLURALITY OF IDENTIFIED ATTRIBUTE CHARACTERISTICS AS INPUT USING ONE OR MORE MACHINE LEARNING MODELS TO ASSIGN A TYPE OF SUB-PRIMAL CUT TO THE SUB-PRIMAL CUT AS OUTPUT

END

FIG. 15

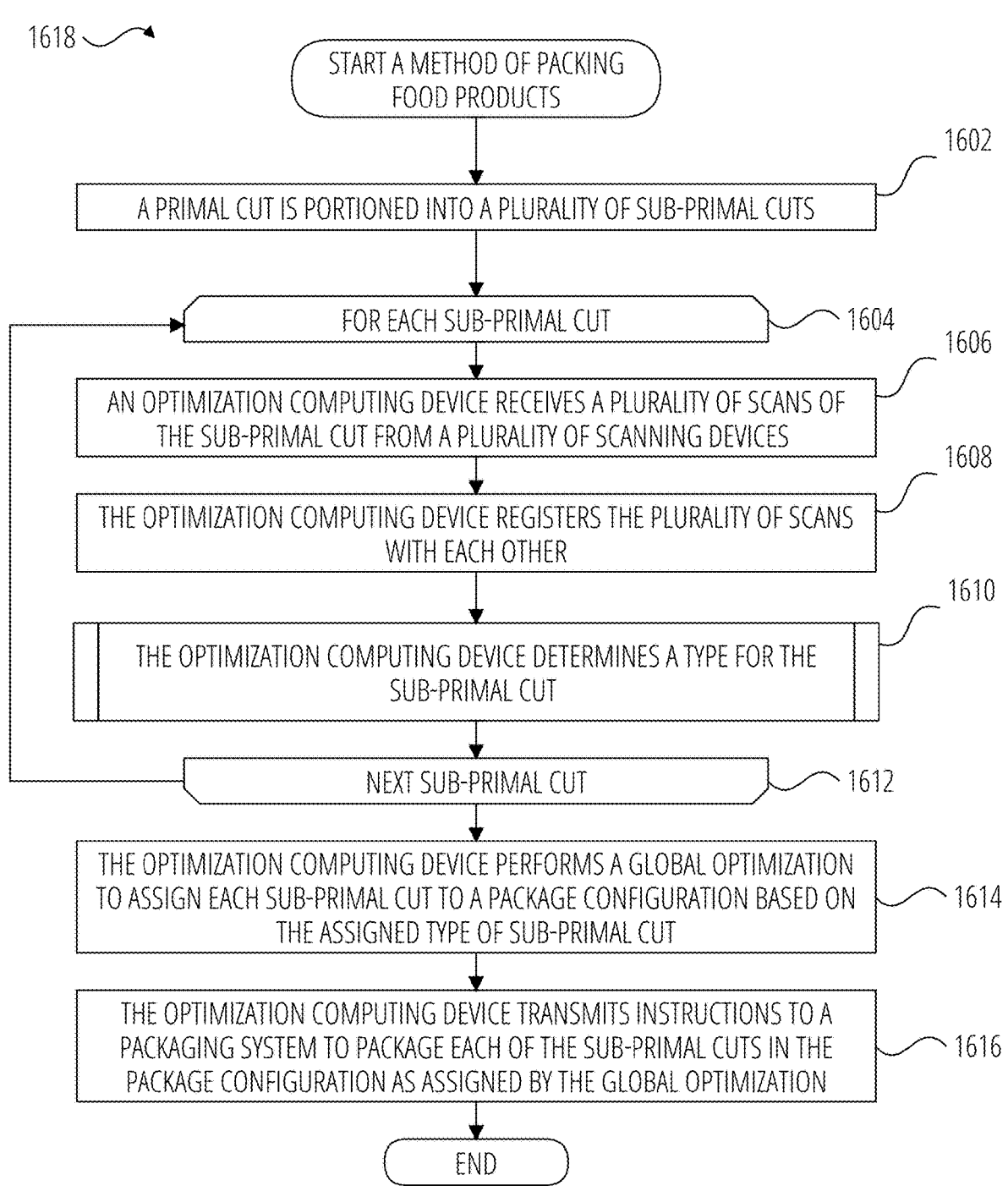

1618

START A METHOD OF PACKING FOOD PRODUCTS

A PRIMAL CUT IS PORTIONED INTO A PLURALITY OF SUB-PRIMAL CUTS — 1602

FOR EACH SUB-PRIMAL CUT — 1604

1606

AN OPTIMIZATION COMPUTING DEVICE RECEIVES A PLURALITY OF SCANS OF THE SUB-PRIMAL CUT FROM A PLURALITY OF SCANNING DEVICES

1608

THE OPTIMIZATION COMPUTING DEVICE REGISTERS THE PLURALITY OF SCANS WITH EACH OTHER

1610

THE OPTIMIZATION COMPUTING DEVICE DETERMINES A TYPE FOR THE SUB-PRIMAL CUT

NEXT SUB-PRIMAL CUT — 1612

THE OPTIMIZATION COMPUTING DEVICE PERFORMS A GLOBAL OPTIMIZATION TO ASSIGN EACH SUB-PRIMAL CUT TO A PACKAGE CONFIGURATION BASED ON THE ASSIGNED TYPE OF SUB-PRIMAL CUT — 1614

THE OPTIMIZATION COMPUTING DEVICE TRANSMITS INSTRUCTIONS TO A PACKAGING SYSTEM TO PACKAGE EACH OF THE SUB-PRIMAL CUTS IN THE PACKAGE CONFIGURATION AS ASSIGNED BY THE GLOBAL OPTIMIZATION — 1616

END

FIG. 16

SUB-PRIMAL CUT IDENTIFICATION AND PACKAGING OPTIMIZATION SYSTEM AND METHOD

CROSS-REFERENCE TO RELATED APPLICATION

This application claims the benefit of U.S. Provisional Application No. 63/375,215, filed Sep. 9, 2022, the entire contents of which are incorporated herein by reference.

BACKGROUND

Workpieces, including food products, are portioned or otherwise cut into smaller pieces by processors in accordance with customer needs. The first division of a carcass is into primal cuts. More specifically, a primal cut or cut of meat is a piece of meat initially separated from the carcass of an animal during butchering or processing. Examples of primal cuts include the round, loin, rib, and chuck for beef or the ham, loin, Boston butt, and picnic for pork. Primal cuts are then divided into sub-primal cuts. Examples of sub-primal cuts of beef are the top round, whole tenderloin, and rib eye, and examples of sub-primal cuts of pork are the sirloin chop, center loin chop, center rib chop, and rib end chop.

Processing sub-primal cuts may vary depending on the type of sub-primal cut. For instance, certain types of sub-primal cuts may be portioned or trimmed in accordance with customer specifications or other requirements specific to that cut type. Moreover, certain types of sub-primal cuts may be used in certain end products depending on, for instance, supply and demand of the types of sub-primal cuts.

SUMMARY

In some aspects, the techniques described herein relate to a computer-implemented method of optimizing the processing of a sub-primal cut, the method including: receiving, by an optimization computing device, a plurality of models, wherein each model is associated with a type of sub-primal cut, wherein each model includes at least a first reference shape for detection of a first match characteristic by a first scan type and a second reference shape for detection of a second match characteristic by a second scan type, and wherein each model includes a plurality of attribute characteristic value ranges; receiving, by the optimization computing device, a registered scan of a sub-primal cut including a first scan of the first scan type showing the first match characteristic and a second scan of the second scan type showing the second match characteristic; identifying, by the optimization computing device, a plurality of attribute characteristics for the sub-prime cut using at least one of the first and second scan types of the registered scan; for each model of the plurality of models: concurrently aligning the first reference shape of the model to the first match characteristic of the first scan type and the second reference shape of the model to the second match characteristic of the second scan type; and calculating a plurality of shape match values based on the alignment of the first and second match characteristics with the first and second reference shapes; calculating a plurality of attribute match values based on the identified plurality of attribute characteristics compared to the attribute characteristic value ranges; determining a best model match for the registered scan using the plurality of attribute match values and the plurality of shape match values; and assigning a type of sub-primal cut to the sub-primal cut based on the best model match.

In some aspects, the techniques described herein relate to a method of training one or more machine learning models to generate a plurality of models, each associated with a type of sub-primal cut, including: receiving, by a model generation computing device, a first set of training data including registered scans of a plurality of sub-primal cuts, each of the registered scans including a first scan of a first scan type showing a first match characteristic for the sub-primal cut and a second scan of a second scan type showing a second match characteristic for the sub-primal cut, each of the registered scans associated with a type of sub-primal cut; adding, by the model generation computing device, the first set of training data for each type of sub-primal cut in a training data store; training, by the model generation computing device, the one or more machine learning models to generate a model for each type of sub-primal cut using information stored in the training data store as input, each model including a first reference shape representing the first match representing the first scan type of the registered scans of a plurality of sub-primal cuts and a second reference shape representing the second match characteristic by the second scan type of the registered scans of a plurality of sub-primal cuts; and storing, by the model generation computing device, the one or more machine learning models in a model data store.

In some aspects, the techniques described herein relate to a method of using one or more machine learning models to assign a type of sub-primal cut to a sub-primal cut, the method including: receiving, by an optimization computing device, a registered scan of the sub-primal cut aligned with a plurality of models, wherein each registered scan includes a first scan of a first scan type showing a first match characteristic and a second scan of a second scan type showing a second match characteristic, the registered scan that is aligned with a model, and wherein each model is associated with a type of sub-primal cut, wherein each model includes at least a first reference shape for detection of a first match characteristic by a first scan type and a second reference shape for detection of a second match characteristic by a second scan type, and wherein each model includes one or more attribute characteristic value ranges; receiving, by the optimization computing device, a plurality of identified attribute characteristics for the sub-primal cut; retrieving, by the optimization computing device, one or more machine learning models from a model data store; and processing, by the optimization computing device, the aligned registered scan and the plurality of models and the plurality of identified attribute characteristics of the sub-primal cut as input using the one or more machine learning models to assign a type of sub-primal cut to the sub-primal cut as output.

In some aspects, the techniques described herein relate to a computer-implemented method of optimizing the processing of a sub-primal cut, the method including: receiving, by an optimization computing device, a plurality of models, wherein each model is associated with a type of sub-primal cut, wherein each model includes at least a first reference shape for detection of a first match characteristic by a first scan type and a second reference shape for detection of a second match characteristic by a second scan type, and wherein each model includes a plurality of attribute characteristic value ranges; receiving, by the optimization computing device, a registered scan of a sub-primal cut including a first scan of the first scan type showing the first match characteristic and a second scan of the second scan type showing the second match characteristic; identifying, by the optimization computing device, a plurality of attribute characteristics for the sub-primal cut using at least one of the first and second scan types of the registered scan; for each model of the plurality of models: aligning the first reference shape of the model to the first match characteristic of the first scan type; calculating at least one shape match value based on the alignment of the first match characteristic with the first reference shape; concurrently aligning the first reference shape of the model to the first match characteristic of the first scan type and the second reference shape of the model to the second match characteristic of the second scan type; calculating at least one shape match values based on the alignment of the first and second match characteristics with the first and second reference shapes; calculating a plurality of attribute match values based on the identified plurality of attribute characteristics compared to the attribute characteristic value ranges; determining a best model match for the registered scan using the plurality of attribute match values and the shape match values; and assigning a type of sub-primal cut to the sub-primal cut based on the best model match.

DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 1 shows an upper photograph of a top side of a sliced full bone-in pork loin and a lower photograph of a bottom side of the sliced full bone-in pork loin.

FIG. 2 shows photographs of a rib eye chop of a sliced full bone-in pork loin.

FIG. 3 shows photographs of a rib center chop of the sliced full bone-in pork loin of FIG. 2.

FIG. 4 shows photographs of a rib center chop of a sliced full bone-in pork loin of FIG. 2.

FIG. 5 shows photographs of a center cut loin of a sliced full bone-in pork loin of FIG. 2.

FIG. 11A shows a screenshot of various images generated from one or more scanning devices of the sub-primal cut identification assembly according to various aspects of the present disclosure.

FIG. 12 show a flowchart that illustrates a non-limiting example of a method of determining a type of sub-primal cut for a sub-primal cut according to various aspects of the present disclosure.

FIG. 13 show a flowchart that illustrates a non-limiting example of a method for obtaining a plurality of models according to various aspects of the present disclosure.

FIGS. 14A and 14B show a flowchart that illustrates a non-limiting example of a method of training one or more machine learning models to generate a plurality of models each associated with a type of sub-primal cut according to various aspects of the present disclosure.

FIG. 15 shows a flowchart that illustrates a non-limiting example of a method of using one or more machine learning models to assign a type of sub-primal cut to a sub-primal cut according to various aspects of the present disclosure.

FIG. 16 show a flowchart that illustrates a non-limiting example of a method of packaging food products according to various aspects of the present disclosure.

DETAILED DESCRIPTION

Figure 6:
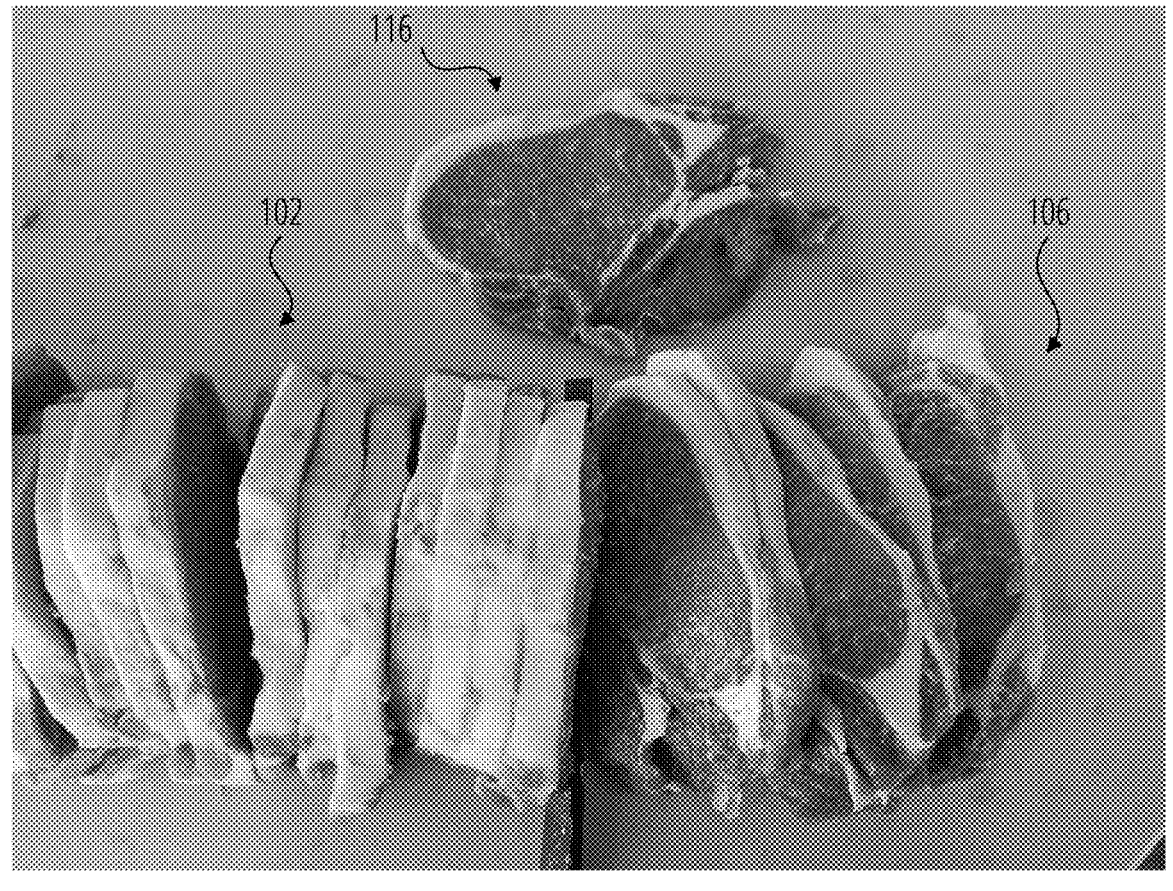
FIG. 6 shows photographs of a first sirloin chop of a sliced full bone-in pork loin of FIG. 2.

Systems and methods disclosed herein are directed to identifying sub-primal cuts and categorizing the sub-primal cut into one of at least two categories, such as for value sorting and/or value optimizing use of the sub-primal cuts. In some examples, a sub-primal cut may be identified by processing a scanned image(s) of the sub-primal cut to determine whether the sub-primal cut is shaped like a certain type of chop and whether the sub-primal cut has the characteristics of a certain type of chop. The systems and methods disclosed herein may include identifying a type of sub-primal cut for the sub-primal cut that is being moved along a food processing line such that the sub-primal cut may be at least one of portioned, sorted, packaged, or the like based on its identified type.

Referring to FIGS. 1-7, examples are described herein with reference to sub-primal cuts or "chops" of a full bone-in pork loin. However, it should be appreciated that the systems and methods described herein may be used for any sub-primal cuts. Accordingly, any reference to "chop" or the like should be understood to include any sub-primal cut (e.g., sub-primal cuts of beef, chicken, or other meat, sub-primal cuts of fish, types of plant-based meats, etc.). Moreover, while the system and methods disclosed herein are described as being used to identify sub-primal cuts and categorizing the sub-primal cut, other types of workpieces are also within the scope of the present disclosure. Accordingly, when the phrase "chop", "cut", "sub-primal cut", or the like is used to describe aspects of the system and method, it should be understood that other work products or workpieces may also be used or included. Conversely, when the term "work product", "workpiece", "food product", or the like is used to described aspects of the systems and methods, it should be understood to include any "chop", "cut", "sub-primal cut", or the like.

Exemplary types and categorizations of sub-primal cuts will now be described with reference to FIGS. 1-7.

Referring to FIG. 1 (showing a top side of a pork loin in the top photo image and a bottom side of the loin in the bottom photo image), a full bone-in pork loin 102 may be sliced into chops from rib end 104 to sirloin end 106, with each chop optionally being substantially the same thickness.

Each chop or a group of chops (from a section of the loin) may include different chop characteristics that affect its overall quality or value. The chop characteristics may depend on various factors, such as the characteristics of the full bone-in pork loin (e.g., its leanness, bone size, etc.), the cut location of the chop along the length of the pork loin (e.g., near the rib end or sirloin end), the slicing process, etc. Chop characteristics may include an overall shape/size or the entire object outline, length, width, height, weight, points, area, percentage of fat v. lean, concavity, flatness, roundness, bone quantity, bone area, bone length, bone edge offset, bone to meat ratio, blood spots, holes, bruises, parasites, unwanted bones, etc. These chop characteristics can affect the categorization and/or value of the chop. Data pertaining to one or more of these chop characteristics can be considered "attribute data" of the chop.

Various types and categories of chops result from the slicing process of the loin, as shown in FIGS. 2-7. For instance, referring to FIG. 2, a first chop 108 sliced from the full bone-in pork loin 102 near the rib end 104 of the loin (see also FIG. 1) may be determined to be a rib eye type of chop based on its entire object outline or overall shape 202, the shape of its main lean area 204, and/or the shape of its bone area 206. More specifically, based on a comparison of shapes of those areas to known shapes for a rib eye type of chop, the first chop 108 may be assigned as a rib eye type of chop.

The first chop 108 may be further categorized as a certain type of rib eye chop depending on at least two other characteristics of the chop. For instance, the first chop 108 includes a spinalis 208 that is greater than a certain size and a certain quantity of bones, which can affect the categorization of rib eye assigned to the first chop 108 (e.g., rib eye chop 1 v. rib eye chop 2). The type of chop (e.g., rib eye v. center cut) and the categorization of the chop (e.g., rib eye chop 1 v. rib eye chop 2) can ultimately determine how the chop is used (e.g., portioned, sorted, packaged, etc.) for value sorting and/or value optimizing use of the chops. For ease of reference, the ultimate designation for the chop, including the type and categorization, may simply be referred to as the "type" of chop.

FIG. 3 shows a second chop 110 sliced from the full bone-in pork loin 102 further from the rib end 104 of the loin 102 as compared to the first chop 108 (see also FIG. 1). The second chop 110 may be determined to be a rib center type of chop based on its overall shape 302, the shape of its main lean area 304, and/or the shape of its bone area 306. More specifically, based on a comparison of shapes of those areas to known shapes for a rib center type of chop, the second chop 110 may be assigned as a rib center type of chop.

The second chop 110 may be further categorized as a certain type of rib center chop depending on at least two other characteristics of the chop. For instance, the second chop 110 includes a spinalis 308 that is smaller than the spinalis 208 of the first chop 108, as well as a certain quantity of bones. Accordingly, the second chop 110 may be categorized as a rib center chop 1.

By comparison, a third chop 112 shown in FIG. 4, which is sliced from the full bone-in pork loin 102 further from the rib end 104 of the loin 102 as compared to the second chop 110 (see also FIG. 1) may also be identified as a rib center type of chop based on its overall shape 402, the shape of its main lean area 404, and/or the shape of its bone area 406. However, the third chop 112 may be categorized as a rib center chop 2 because no spinalis is present and/or a tenderloin area 408 is smaller than a predetermined size of another categorization of rib center chop.

FIG. 5 shows a fourth chop 114 sliced from the full bone-in pork loin 102 near the sirloin end 106 of the loin 102 (see also FIG. 1). The fourth chop 114 may be determined to be a center cut loin type of chop based on its overall shape 502, the shape of its main lean area 504, and/or the shape of its bone area 506 compared to shapes of those areas to known shapes for a center cut loin type of chop. Moreover, the fourth chop 114 may be categorized as a center cut loin 1 based on a size of a tenderloin area 508 and/or a quantity of bones present.

Figure 7A:
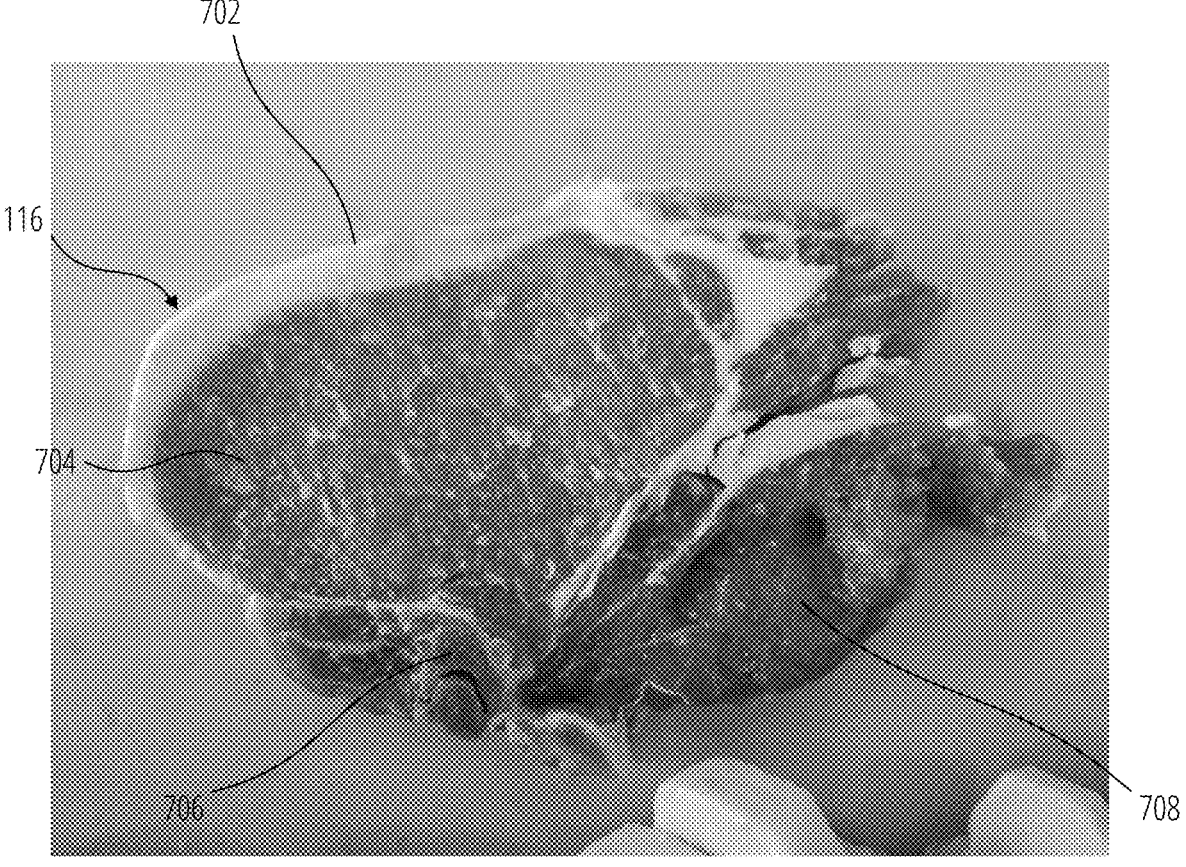
FIG. 7A shows a photograph of the first sirloin chop of FIG. 6.

FIGS. 6 and 7A shows a fifth chop 116 sliced from the full bone-in pork loin 102 nearer the sirloin end 106 of the loin 102 as compared to the fourth chop 114 (see also FIG. 1). The fifth chop 116 may be determined to be a sirloin type of chop based on its overall shape 702, the shape of its main lean area 704, and/or the shape of its bone area 706 compared to shapes of those areas to known shapes for a center cut loin type of chop. Moreover, the fifth chop 116 may be categorized as a sirloin chop 1 based on a size of a tenderloin area 708.

Figure 7B:
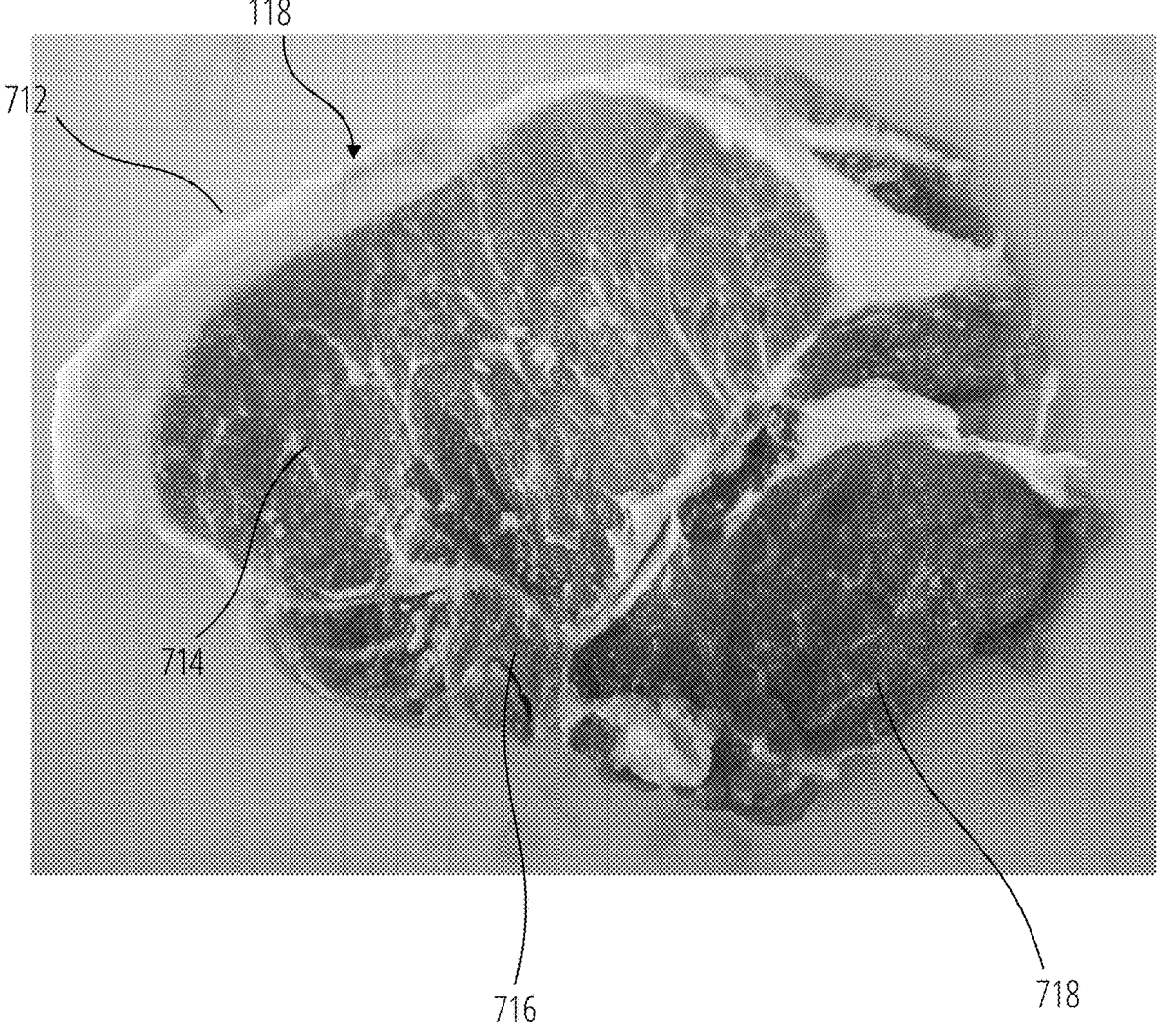
FIG. 7B shows a photograph of a second sirloin chop of the sliced full bone-in pork loin of FIG. 2.

By comparison, a sixth chop 118 shown in FIG. 7B, which is sliced from the full bone-in pork loin 102 nearest the rib end 104 of the loin 102 may also be identified as a sirloin type of chop based on its overall shape 712, the shape of its main lean area 714, and/or the shape of its bone area 716. However, the sixth chop 118 may be categorized as a sirloin chop 2 because a tenderloin area 720 is smaller or larger than a predetermined size of another categorization of sirloin chop.

As can be appreciated, various factors, including the shape(s) of the chop and other characteristics of the chop (e.g., percentage of fat v. lean, concavity, flatness, roundness, bone quantity, bone area, bone length, bone edge offset, bone to meat ratio, etc.) can determine how a chop type is identified and how the chop is categorized.

To re-emphasize a point made above, although examples, including the above descriptions are described herein with reference to "chops" of a full bone-in pork loin, the systems and methods described herein may be used for any sub-primal cuts or workpieces. Accordingly, any reference to "chop" or the like should be understood to include any sub-primal cut or other workpiece that can be identified and/or categorized using the system and methods described herein for value optimization or the like.

As noted above, systems and methods disclosed herein are directed to identifying sub-primal cuts and categorizing the sub-primal cut into one of at least two categories. Identification of the sub-primal cuts (e.g., rib eye chop, rib center chop, center cut loin, sirloin chop, etc.) may be done by comparing a reference shape(s) of a sub-primal cut to known shapes of a type of sub-primal cut and further determining whether the sub-primal cut has some or all of the attribute characteristics (e.g., percentage of fat v. lean, concavity, flatness, roundness, bone quantity, bone area, bone length, bone edge offset, bone to meat ratio, etc.) of the sub-primal cut type. Categorization of sub-primal cuts (e.g., rib eye chop 1 v. rib eye chop 2) may be done by, for instance, identifying attribute characteristics of the sub-primal cut and determining whether the sub-primal cut has some or all of the attribute characteristics of certain sub-primal cut types.

Figure 8:
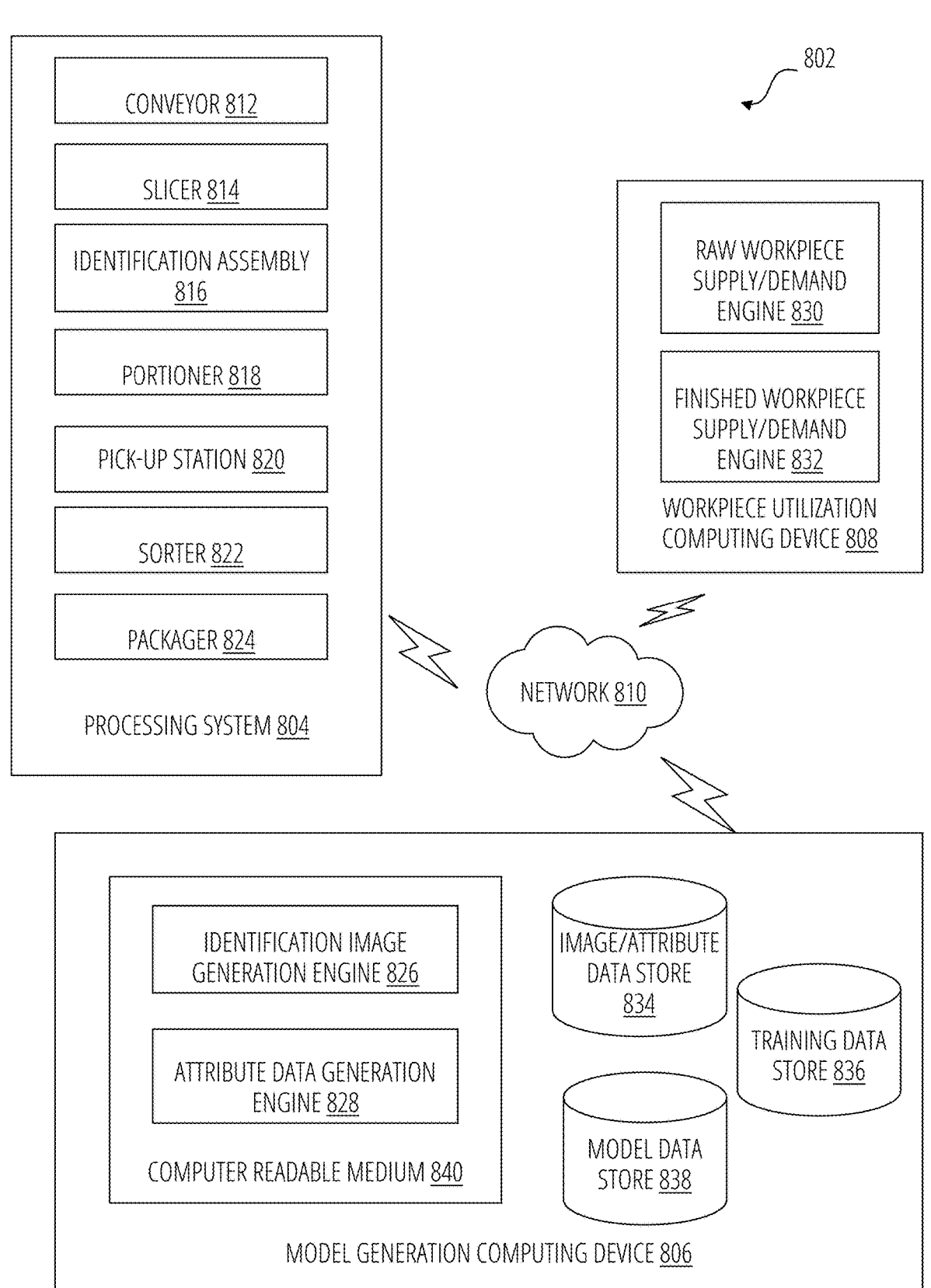
FIG. 8 shows a block diagram of a non-limiting example of a sub-primal cut identification and packaging optimization system according to various aspects of the present disclosure.

FIG. 8 depicts a schematic illustration of a non-limiting example of a sub-primal cut optimization system 802 that can be used to identify sub-primal cuts and categorize the sub-primal cut into one of at least two categories. In the example shown, the sub-primal cut optimization system 802 is generally configured for identifying a type and category of sub-primal cut for a sub-primal cut that is being moved along a food processing line such that the sub-primal cut may be at least one of portioned, sorted, packaged, or the like based on its identified type/category. The sub-primal cut optimization system 802 may include various networked computing devices configured for carrying out aspects of identifying a type of sub-primal cut and categorizing the sub-primal cut, as well as other aspects of processing the sub-primal cut (e.g., conveying, slicing, portioning, sorting, packaging, etc.).

In the depicted example, the sub-primal cut optimization system 802 includes a processing system 804, a model generation computing device 806, and a workpiece utilization computing device 808 communicatively coupled together through a network 810. The network 810 can be any kind of network capable of enabling communication between the various components of the sub-primal cut optimization system 802. For example, the network can be a WiFi network.

The processing system 804 will first be described with reference to FIGS. 8 and 9. In one example, the processing system 804 is generally configured to carry out processing of the sub-primal cut, both before and after the sub-primal cut is identified and/or categorized. For instance, the processing system 804 includes a conveyor 812 or another movement device configured to carry workpieces WP, or sub-primal cuts between various portions of the processing system 804. For instance, the conveyor 812 may carry the sub-primal cuts between one or more of a slicer 814, an identification assembly 816, a portioner 818, a pick-up station 820, a sorter 822, and a packager 824.

Slicer 814 may be used to slice a primal product into a sub-primal workpiece, such as slicing a primal cut into sub-primal cuts. In that regard, the slicer 814 may be located downstream from a cutter (not shown) used to cut a carcass into primal cuts. Various types of slicers may be utilized to slice the primal cut into one or more desired thicknesses of sub-primal cuts. For example, the slicer may be in the form of a high-speed water jet, a laser, a rotary saw, a hacksaw, or band saw. Also, the slicer may be adjustable so that a desired thickness of each individual workpiece or sub-primal cut is obtained. Such adjustment may be under the control of a processor, such as an optimization computing device 902 (see FIG. 9). For example, the slicer may be adjusted based on data sent from the workpiece utilization computing device 808 regarding finished workpiece supply/demand requirements (e.g., there is a certain demand for ⅜" thick cuts v. 1" cuts, so the slicer is adjusted to meet the demand).

In some examples, the processing system 804 receives the sub-primal cuts (i.e., sliced cuts from a primal cut) from another machine or location, and the slicer 814 is excluded. In some examples, the slicer 814 is used to portion the sub-primal cuts before they are processed by at least certain components of the identification assembly 816 for identification. In that regard, the terms "slicing", "portioning", "cutting", 'trimming", or the like may include any type of, or any combination of, product cutting (e.g., slicing alone, portioning alone, or any other type of product cutting, and any combination of slicing, portioning, and other type of product cutting).

After the sub-primal cut is sliced and identified by the identification assembly 816, the portioner 818 may be used to further cut, slice, trim, or otherwise portion the sub-primal cuts into one or more end products. In that regard, the portioner 818 may be located downstream of the identification assembly 816 for cutting the workpiece after it has been identified as a certain type of sub-primal cut. The portioner

818 is in communication with the optimization computing device 902 such that it may receive cutting instructions based upon the identified type of sub-primal cut for the workpiece.

For example, certain types of sub-primal cuts may be designated as requiring trimming to support product or packaging requirements (such as defined by the finished workpiece supply/demand engine 832 of the workpiece utilization computing device 808). Accordingly, if the sub-primal cut is identified as one of those types of sub-primal cuts, it may be trimmed by the portioner 818 after it is identified as such a type of sub-primal cut. In a more specific example, if the spinalis of a pork chop is identified as high value in data sent to the optimization computing device 902, such as from a finished workpiece supply/demand engine 832 of the workpiece utilization computing device 808, in some instances the optimization computing device 902 may instruct the portioner 818 to remove or otherwise cut the spinalis from pork chops of a certain identified type for packaging or product optimization. For instance, if the chop has a spinalis greater than a certain size, the chop may be portioned to remove the spinalis for separate use and/or high value packaging.

The cutting, portioning, trimming, etc., of a sub-primal cut based on its identification type may be carried out by a workpiece processing module (not shown) in the optimization computing device 902 or in a separate computing device in communication in the processing system 804. In that regard, the optimization computing device 902 may send some or all of the data relating to identification of the sub-primal cuts to the workpiece processing module so that the workpiece processing module may carry out any necessary cutting or other processing of the sub-primal cut. In some examples, if the workpiece processing module receives data identifying the type of sub-primal cut, it may carry out further scanning and analysis to determine how the cut should be trimmed. In some examples, the workpiece processing module may be able to carry out all necessary cutting or other processing of the sub-primal cut based on the received identification data without conducting any further scanning or analysis.

After any portioning, trimming, etc., the sub-primal cut (and/or any material removed from the sub-prima cut) may be transferred to a takeaway conveyor, storage bin, the sorter 822, the packager 824, or other location, such as with a pick-up station 820. The pick-up station 820, sorter 822, and packager 824 may receive instructions from the optimization computing device 902 based upon the identified type of sub-primal cut for the workpiece. For example, if the workpiece is identified as a trim piece, the optimization computing device 902 may instruct the pick-up station 820 and/or the sorter 822 to remove or divert the trim piece from the conveyor such that it is not packaged with any sub-primal cuts. In another example, the optimization computing device 902 may instruct the pick-up station 820 and/or the sorter 822 to transfer all sub-primal cuts of a certain type to a designated conveyor, bin, etc., for packaging together. In yet another example, the optimization computing device 902 may instruct the packager 824 to package a certain number of sub-primal cuts (optionally in a certain layout within the package) based on the number of sub-primal cuts of a certain type identified and the demand data received from the finished workpiece supply/demand engine 832.

Figure 9:
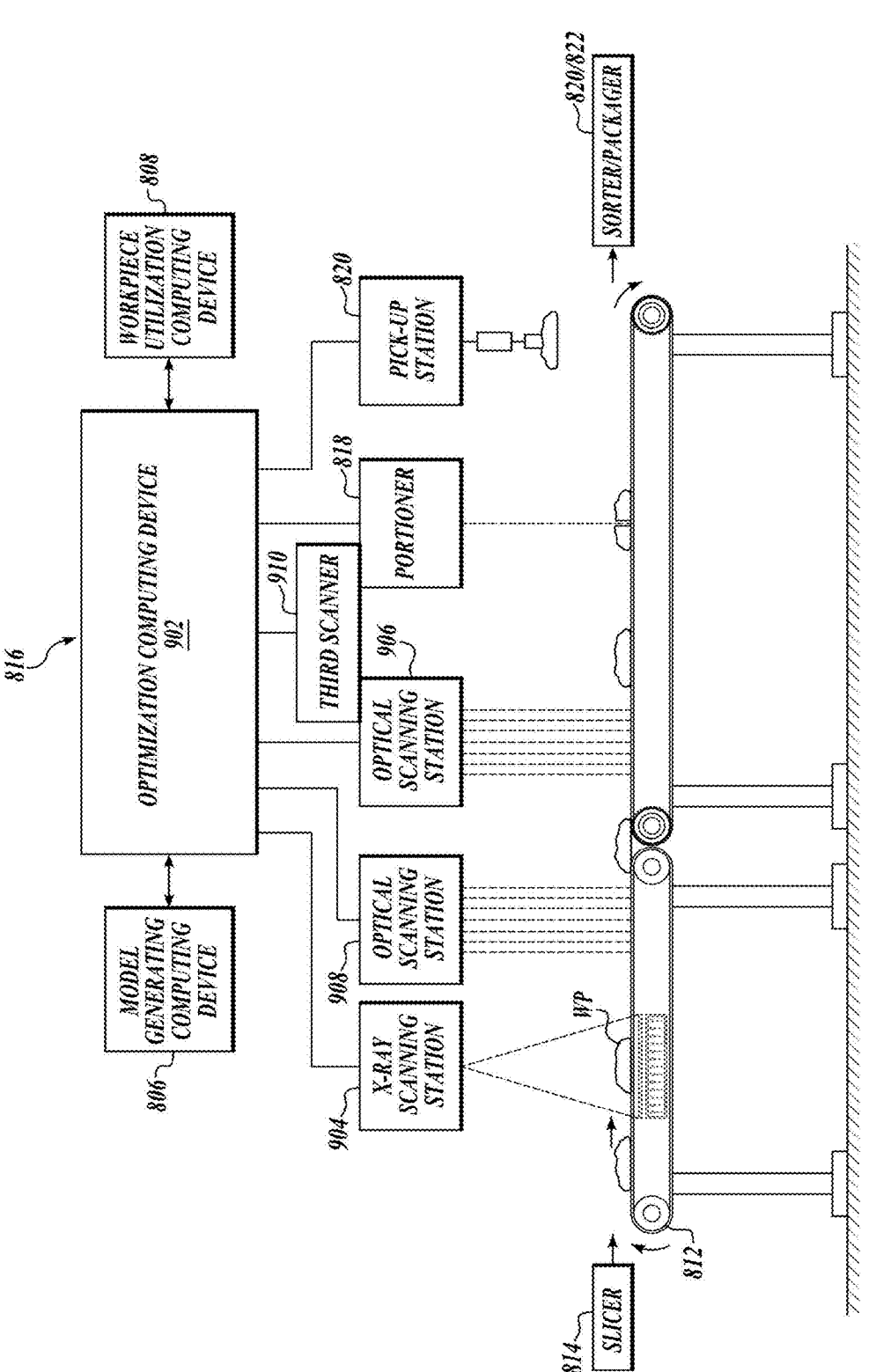
FIG. 9 shows a schematic illustration of a non-limiting example of a sub-primal cut processing system according to various aspects of the present disclosure.

Although FIGS. 8 and 9 depict specific components and sub-assemblies of a processing system, it should be appreciated that any other suitable arrangement of processing components may be used. For instance, the processing system 804 may incorporate aspects of the systems shown and described in U.S. Pat. No. 7,651,388, entitled "Portioning apparatus and method", U.S. Pat. No. 7,672,752, entitled "Sorting workpieces to be portioned into various end products to optimally meet overall production goals", and U.S. Pat. No. 8,688,267, entitled "Classifying workpieces to be portioned into various end products to optimally meet overall production goals", hereby incorporated by reference herein in their entirety.

Figure 10:
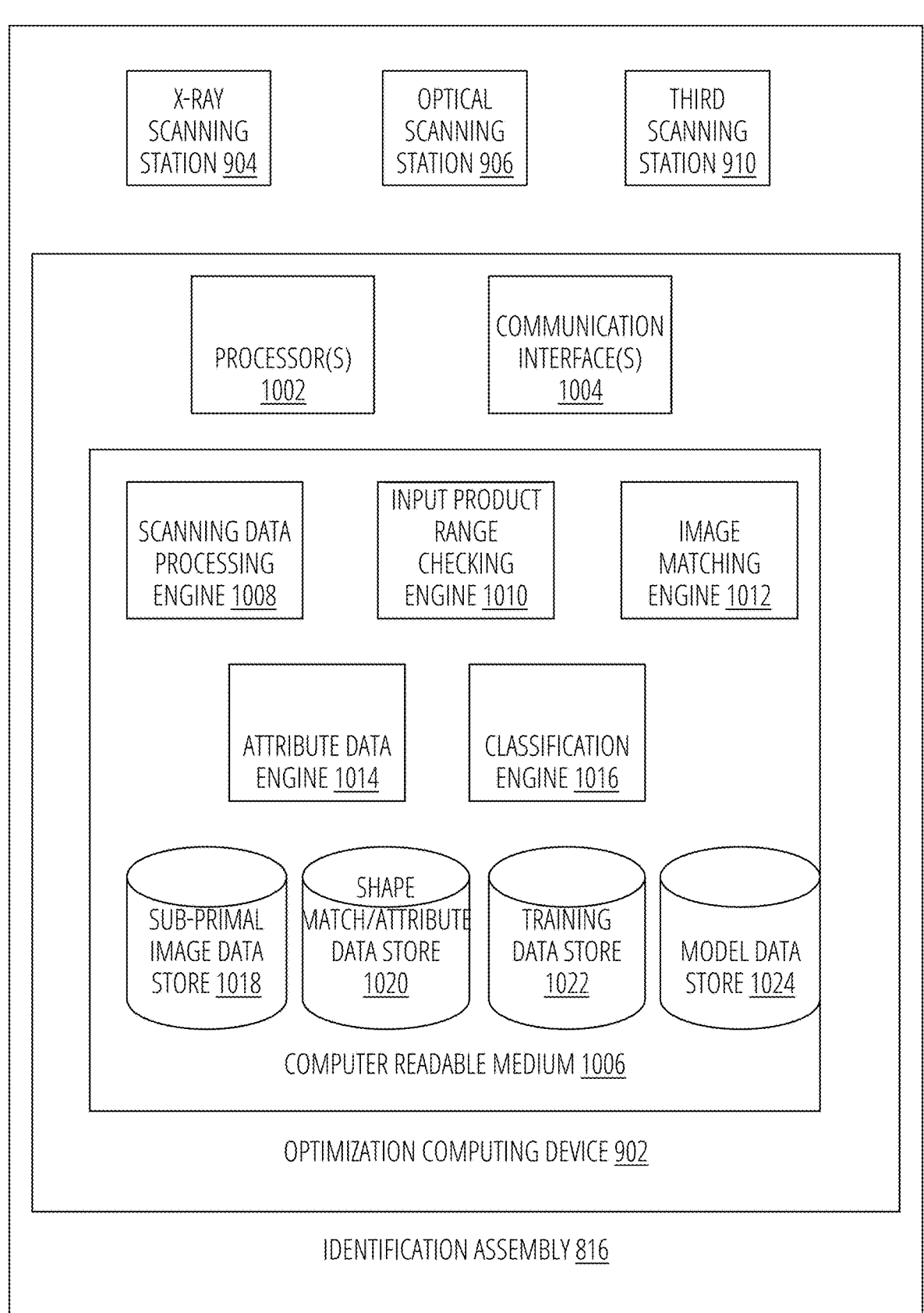
FIG. 10 shows a block diagram of a non-limiting example of a sub-primal cut identification assembly according to various aspects of the present disclosure.

Referring to FIGS. 8-10, the identification assembly 816, which is used to identify a type/category of each sub-primal cut, will now be described in further detail. In general, the identification assembly 816 is configured to generate a registered scan of a sub-primal cut including a first scan of a first scan type showing a first match characteristic of the sub-primal cut and a second scan of a second scan type showing a second match characteristic. The identification assembly 816 then uses the registered scan for identifying a type/category of each sub-primal cut.

FIG. 10 is a block diagram that illustrates aspects of a non-limiting example of the identification assembly 816 according to various aspects of the present disclosure. The identification assembly 816 includes at least a first scanner for capturing a first scan type and a second scanner for capturing a second scan type such that first and second scans of first and second types may be processed to generate the registered scan. For instance, in one example, the identification assembly 816 includes an X-ray scanning station 904, an optical scanning station 906, and a third scanning station 904 of a same or different type. The identification assembly 816 further includes the optimization computing device 902, which includes a processor(s) 1002, a communication interface(s) 1006, and computer readable medium 1004, and one or more data stores.

The optimization computing device 902 may be implemented by any computing device or collection of computing devices, including but not limited to a desktop computing device, a laptop computing device, a mobile computing device, a server computing device, a computing device of a cloud computing system, and/or combinations thereof. In some examples, the processor(s) 1002 may include any suitable type of general-purpose computer processor. In some examples, the processor(s) 1002 may include one or more special-purpose computer processors or AI accelerators optimized for specific computing tasks, including but not limited to graphical processing units (GPUs), vision processing units (VPTs), and tensor processing units (TPUs).

In some examples, the communication interface(s) 1004 includes one or more hardware and or software interfaces suitable for providing communication links between components. The communication interface(s) 1004 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 1006 has stored thereon logic that, in response to execution by the one or more processor(s) 1002, cause the optimization computing device 902 to provide a scanning data processing engine 1008, an input product range checking engine 1010, an image matching engine 1012, an attribute data engine 1014, and a classification engine 1016.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

As used herein, "engine" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Referring to FIG. 9, the scanner stations of the identification assembly 816 will now be described. As noted above, the identification assembly 816 is configured to generate a registered scan of a sub-primal cut including a first scan of a first scan type (i.e., using a first scanner) showing a first match characteristic of the sub-primal cut and a second scan of a second scan type (i.e., using a second scanner) showing a second match characteristic. The match characteristics are defined by image features of each scan type. The scanners used to generate a registered scan of a sub-primal cut may depend on the types of images needed to generate match characteristics of the sub-primal cut.

For instance, the first scanner may be an X-ray scanning station 904 for taking an X-ray of the sub-primal cut to show a higher density area (e.g., a bone area and/or an outline of the cut) as a first match characteristic. The second scanner may be an optical scanning station 906 for generating at least one of a visible light (e.g., greyscale) image, a laser light scattering image, a height map, a hyperspectral image, a multispectral image, etc., of the sub-primal cut to show one or more of the overall shape/size of the sub-primal cut, a composition of the sub-primal cut (e.g., fat. v. lean meat), a height or thickness over the area of the sub-primal cut, etc. In some examples, the identification assembly 816 further includes a third scanning station 910 for capturing a third scan type showing a third match characteristic of the sub-primal cut. Any other scanners may additionally be used to capture scan types showing additional match characteristics of the sub-primal cut. The identification assembly 816 may use one or more of the scanners and/or systems and methods for processing scanner data described in U.S. patent Ser. No. 10/721,947, entitled "Apparatus for acquiring and analysing product-specific data for products of the food processing industry as well as a system comprising such an apparatus and a method for processing products of the food processing industry," hereby incorporated by reference herein in its entirety.

The scanner stations of the identification assembly 816 may capture scans of the sub-primal cuts and then output scan data to the scanning data processing engine 1008 for processing. In that regard, the scanning data processing engine 1008 may include one or more feature recognition modules for generating views/images from the scan data and/or processing data from the different views. For instance, referring to the generated images shown in FIG. 11A, the scanning data processing engine 1008 may be configured to generate at least one of a fat recognition (FRS) object view, a laser scatter object view, and a height mode object view, such as from data captured with the optical scanning station 906. One or more alternative or additional scanning stations and/or alternative or additional feature recognition modules may be used for capturing one or more scan types and generating views showing additional or different match characteristics of the sub-prime cut. Accordingly, the descriptions and illustrations provided herein should not be seen as limiting.

The X-ray scanning station 904 may be any configuration for generating X-ray images suitable for use in carrying out necessary functions of the identification assembly 816. Generally, X-rays are attenuated as they pass through an object in proportion to the total mass of the material through which the X-rays pass. The intensity of the X-rays (originating from an X-ray source) are received at an X-ray detector, such as detector 962, after they have passed through an object such as workpiece WP (e.g., a sub-primal cut) is therefore inversely proportional to the density of the object. For example, X-rays passing through a pork loin bone, which have a relatively higher density than the loin flesh, will be more attenuated than the X-rays that pass only through the meat of the loin. Thus, X-rays are suited for detecting the existence of certain characteristics, such as bones having a specific density or X-ray modification characteristics. In that regard, a match characteristic of the sub-primal cut defined by the X-ray scan (a first scan type) may be location of bones or other higher density materials within the sub-primal cut. In further examples, a match characteristic of the sub-primal cut defined by the X-ray scan (a first scan type) may be the overall outline or perimeter of the sub-primal cut.

A general description of the nature and use of X-rays in processing workpieces can be found in U.S. Pat. No. 5,585,605, entitled "Optical-scanning system employing laser and laser safety control", U.S. patent Ser. No. 10/654,185, entitled "Cutting/portioning using combined X-ray and optical scanning", as well as U.S. patent Ser. No. 10/721,947 (referenced above), incorporated herein by reference in their entirety. The signals generated by the X-ray detector are transmitted to a scanning data processing engine 1008 of the optimization computing device 902, which processes the signals for generating the registered scan, identifying attribute characteristics, or performing another processing or identification step.

After the workpiece WP has been scanned at X-ray scanning station 904, it is moved by the conveyor 812 (optionally by transferring to a second or downstream (portioning) conveyor located downstream of a first (scanning) conveyor) such that it passes beneath a second scanner, such as the optical scanning station 906. The optical scanning station 906 may include a scanner located in a housing to view workpiece WP illuminated by one or more light sources. The optical scanning station 906 captures an optical image, such as a visible light image of the workpiece WP and transmits the image(s)/data to the scanning data processing engine 1008 of the optimization computing device 902.

The optical scanning at station 906 may utilize a variety of different scanning technologies in the visible light as well as hyperspectral range. Scanning with the optical scanning station 906 can be carried out using a variety of techniques, such as the techniques shown and described in U.S. patent Ser. No. 10/654,185 as well as U.S. patent Ser. No. 10/721,947 (referenced above), incorporated by reference herein. Moreover, the optical scanning station 906 can be configured to capture data used generate a variety of images, such as greyscale images (e.g., images based on a color value from 0-256; grey tones seen by a laser), height maps (which can be generated by assigning a greyscale color to a height value), a fat recognition (FRS) object view (showing fat streaks within the product), a laser scatter image, a hyperspectral image, a multispectral image, etc.

In one example, a video camera (not shown) is used to view workpieces along a line of sight. The workpieces are illuminated by one or more light sources, for example, by a laser beam. The light from the light sources may extend across the moving conveyor to define a sharp shadow or light stripe line, with the area forward of the transverse beam being dark. When no workpiece is being carried by the conveyor, the shadow line/light stripe forms a straight line across the belt. However, when a workpiece passes across the shadow line/light stripe, the upper, irregular surface of the workpiece produces an irregular shadow line/light stripe as viewed by a video camera directed downwardly on the workpiece and the shadow line/light stripe.

The video camera detects the displacement of the shadow line/light stripe from the position it would occupy if no workpiece WP were present on the conveyor. This displacement represents the thickness of the workpiece along the shadow line/light stripe, which may be processed by one or more feature recognition modules of the scanning data processing engine 1008 for generating one or more views (such as a fat recognition (FRS) object view, a laser scatter object view, and a height mode object view etc., as shown in FIG. 11A). The length of the workpiece may be determined by the length of the time that the shadow lines are created by the workpiece. In this regard, an encoder may be integrated into the structure of the conveyor 812 to generate pulses at fixed time intervals corresponding to the forward movement of the conveyor.

In some examples, the optical scanning station 906 uses a single SICK® camera with a single laser light source that is suitable for capturing optical data and generating two or more images/views based on the optical data. For instance, the single camera may be in communication with a separate processor (having one or more feature recognition modules or the like) and/or the scanning data processing engine 1008 for generating one or more views from the captured optical data, such as a fat recognition (FRS) object view, a laser scatter object view, and a height mode object view, as shown in FIG. 11A.

In some examples at least two optical cameras, each equipped with a different imaging process system, are used. For example, a simple optical camera, for example a grey-scale camera, and/or RGB camera and/or IR and/or UV camera and/or a charge coupled device (CCD), can be used to acquire and/or generate one or more complete images of the workpiece for detecting certain characteristics, such as, e.g., the outer contour of the workpiece. Moreover, a second, special camera, for example a multispectral or hyperspectral camera, can be used to acquire images/data of specific regions or characteristics of the workpiece, such as blood spots, streaks of fat or the like. It should be appreciated that a single camera/scanner may instead be used to capture all the data needed to generate the various images, such as with various imaging processes.

It can be appreciated that the optical scanning station 906 may be configured for capturing optical data used to generate images for detecting the existence of certain visual characteristics, such as object outline, height, width, points, area, percentage of fat v. lean, concavity, flatness, roundness, etc., any of which could be used as a second match characteristic of the sub-primal cut in the optical scan (a second scan type) as well as a third match characteristic of the sub-primal cut.

Before processing the results of the optical scanning occurring at station 906 for identifying the type of sub-primal cut, the scanning data processing engine 1008 of the optimization computing device 902 may first analyze the data from the X-ray scanning station 904 and the optical scanning station 906 to confirm that the workpiece scanned at station 906 is the same as the workpiece previously scanned at station 904 and/or whether the workpiece has moved or shifted during transfer between conveyors, as discussed in U.S. Pat. Nos. 10,654,185 and 10,721,947 (referenced above), incorporated by reference herein. In that regard, a comparison of the X-ray and optical data may be processed by the scanning data processing engine 1008 of the optimization computing device 902.

The exterior configuration of the workpiece is discernable by the optical scanning station 906, which ascertains parameters related to the size and/or shape of the workpiece WP (for example, length, width, aspect ratio, thickness, thickness profile, contour (both two-dimensionally and three-dimensionally), outer contour configuration; perimeter, outer perimeter configuration, outer perimeter size and/or shape, volume and/or weight, of the workpiece). With respect to the outer perimeter configuration of the workpiece (e.g., outline), the scanner can determine discrete locations along the outer perimeter of the workpiece in terms of an X-Y coordinate system or other coordinate system. This latter information can be used by the optimization computing device 902 to determine/verify that the workpiece being scanned at optical scanning station 906 is the same workpiece as previously scanned at the X-ray scanning station 904. For example, the scanning data processing engine 1008 of the optimization computing device 902 can compare the data identifying coordinates along the outer perimeter of the workpiece as determined by scanning station 906 with the corresponding data obtained previously at X-ray scanning station 904. If the data sets match within a fixed threshold level, then confirmation may be provided that the workpiece scanned at optical station 906 is the same as the workpiece previously scanned at the X-ray scanning station 904.

A transformation or translation of one or more of the images/data may be done to account for any movement/shifting of the workpiece on the conveyor 812, such as using the techniques described in U.S. patent Ser. No. 10/654,185. For instance, translations may include one or more of: directional translation of the workpiece; rotational translation of the workpiece; scaling the size of the workpiece; and shear distortion of the workpiece.

In some instances, a workpiece is removed from the conveyor 812 before the removed workpiece reaches the optical scanning station 906. In such an instance, the next workpiece scanned at optical scanning station 906 will not match the scanning data from the X-ray scanning station 904 because such X-ray scanning data will correspond to the workpiece that has been removed. Thus, the scanning data processing engine 1008 of the optimization computing device 902 will determine that there is not a match between the perimeter coordinate data sets of the workpieces from the scanning stations 904 and 906. As such, the optical scanner 906 will scan the next workpiece that passes beneath the scanning station 906 to determine whether such next workpiece matches the scanning data of a workpiece scanned at the X-ray scanning station 904 and transmitted to the optimization computing device 902.

The scanning data processing engine 1008 will determine whether the workpiece scanned at the optical station 906 corresponds to the workpiece that was scanned at the X-ray scanning station right after the X-ray scanning of the removed workpiece occurred. The scanning data processing engine 1008 will match the correct scanning data from the X-ray scanning station 904 with the scanning data of the same workpiece from the optical scanning station 906. Of course, this is essential so that the location of the bones or other detectable characteristics within the workpiece WP located by the X-ray scanning station 904 coincides with the workpiece scanned by optical scanning station 906 for use in identifying the type of sub-primal cut, as well as for controlling operation of the portioner 818 to excise the bones or other undesirable material from the workpiece or trim/cut the workpiece.

The scanning data processing engine 1008 can go through the "X-ray-optical matching" process a finite number of times. One example of determining the number of data sets from the X-ray scanning that must be checked can be determined as follows. Divide the distance between the x-ray scanning station 904 and the optical scanning station 906 by the sum of the length of product+the product gap+a dimensional factor of safety. For example, if there is a disclosure of 9 feet between the x-ray and optical scanners, and the workpieces are approximately 450 mm long product, then the maximum number of data sets in the queue that will be checked is calculated by: 9*12/(17.7+2+2)=4.9, so five matching attempts are made. The data set from the optical scanner will be compared to five data sets from the X-ray scanner stored in a memory or data store of the optimization computing device 902. For longer length products the number of data sets in the memory queue is smaller than for shorter work products. Also, if the distance between the scanners is short enough, only one matching comparison is carried out. Also, it will be appreciated that differences or changes in belt speed can change the number of comparisons that are possible. With faster belt speed, there may need to be a larger gap between products and/or a larger safety margin and there will be less time to make the necessary calculations.

If no match between the X-ray and optical scans occurs, a "no match found" error message is generated. The system proceeds to the next workpiece arriving in the optical scanner 906, and a next step of searching for the new workpiece is initiated.

If for example one workpiece is removed from the conveyor 812 after the X-ray scanning but before the optical scanning, only two matching attempts should be required before a match occurs. However, in the unlikely event that a workpiece WP is so distorted (such as in a transfer from the first conveyor to the second conveyor) that the scanning data processing engine 1008 fails to recognize the X-ray image of the workpiece, then after the predetermined matching attempts the workpiece will proceed down the conveyor 812 without being identified and/or cut/trimmed/portioned. The above noted error message may be generated, and the unidentified or uncut workpiece can be marked by the scanning data processing engine 1008 and can be removed to a specific location for re-working or other disposition.

Using the above-described "X-ray-optical matching" process, it can be appreciated that there is no need to continuously track the location of the workpiece WP as it is conveyed from X-ray scanning station 904 to optical scanning station 906. Rather, the foregoing described methodologies are used to match the workpiece scanned at X-ray scanning station 904 with the same workpiece scanned at optical station 906. Also, although descriptions herein may indicate that systems of the present disclosure can be used to locate the workpiece on the conveyor 812 at one or more specific points in time, the specific location of the workpiece is not continuously tracked. Moreover, using the above-described techniques, it is not necessary to locate the workpiece at any specific time along the conveyor 812.

A second optical scanning station 908 may be located upstream of the optical scanning station 906 for use in capturing optical image(s)/data before the workpiece WP is transferred from a first (scanning) conveyor to a second (portioning) conveyor. The optical image(s)/data captured by the optical scanning station 908 can be used to generate images for detecting the existence of certain visual characteristics, for confirming that the workpiece scanned at station 906 is the same as the workpiece previously scanned at station 904 and/or whether the workpiece has moved or shifted during transfer between conveyors, as discussed above. The second optical scanning station 908 may be located upstream or downstream of the X-ray scanning station 904. For instance, the second optical scanning station 908 may be used to scan the workpiece when located on a first conveyor, such as described in U.S. patent application Ser. No. 16/887,057, entitled "Determining the Thickness Profile of Work Products", hereby incorporated by reference in its entirety.

Once a match between the X-ray and optical scans occurs (and the optical scan is optionally translated), the X-ray data and optical data is sent to the scanning data processing engine 1008 of the optimization computing device 902 to generate a registered scan for use in identifying the type of sub-primal cut. For instance, a registered scan of the workpiece may be generated by the scanning data processing engine 1008, which maps the X-ray image of the workpiece scanned at the X-ray scanning station 904 onto the (possibly transformed) optical image of the workpiece as scanned by optical scanner 906. In one example, the registered scan is generated by the scanning data processing engine 1008 using the systems and methods described in U.S. patent Ser. No. 10/654,185. For instance, the X-ray data may be mapped onto the optical data, optionally with a transformation or translation of one or more of the images/data to account for any movement/shifting of the workpiece on the conveyor 812.

The registered scan is transmitted to the image matching engine 1012 of the optimization computing device 902 for identifying/categorizing the sub-primal cut based on data contained in the registered scan. The registered scan may also be stored and retrievable from a sub-primal image data store 1018 of the optimization computing device 902.

The registered scan includes at least first match characteristic shown in the X-ray image (e.g., bone area) and a second match characteristic shown in the optical image (e.g., object outline). In some instances, a third match characteristic may be shown in either the X-ray or the optical image. In some instances, the third match characteristic may be shown in a scan of a third scan type used to generate the registered scan (i.e., mapped onto the X-ray image and optical image).

For instance, in one example, one or more images generated by the third scanning station 910 are also used to generate the registered scan. In that regard, after the workpiece WP has been scanned at optical scanning station 906, it can be moved by the conveyor 812 such that it passes beneath the third scanning station 910.

As can be appreciated from the foregoing, the scanners of the identification assembly 816 are used to identify and categorize the workpiece, as will be discussed further below. The information generated from the scanners may also be used to automate the locating and removal of undesirable materials, including foreign matter (e.g., plastic) from the workpieces, the cutting/slicing/portioning/trimming/etc. of workpieces, sorting or packaging or the workpieces, or other aspects of the processing system 804. For instance, the identification assembly 816 may process and send the attribute data and other scan data to the optimization computing device 902, and the optimization computing device 902 or another processor of the processing system 804 may use that information to control one or more aspects of the processing of the workpieces, such as trimming the workpiece. For instance, the processing system 804 may incorporate one or more techniques described in the patents incorporated by reference herein (e.g., U.S. Pat. Nos. 10,654,185, 7,651,388, 7,672,752, and 8,688,267).

In other aspects, one or more of the scanners of the identification assembly 816 may be used to supply data to an input product range checking engine 1010 of the optimization computing device 902 to perform a sub-primal cut product check before the product is further processed for identification/categorization by the identification assembly 816. For instance, scanned X-ray and/or optical data may indicate that the workpiece being conveyed does not meet threshold criteria of any of the sub-primal cut types because it is too small/large (e.g., greater than or less than a certain weight or size), too irregular, etc. For instance, an end piece (sometimes called "blade chop") of the bone-in pork loin 102 cut from one of the rib end 104 or the sirloin end 106 may be smaller in weight and size (and likely thicker) than any of the sub-primal cut types and therefore it may not identifiable as any of the types of sub-primal cuts. In another instances, trim pieces from workpieces may not be identifiable as any of the types of sub-primal cuts because of their small and/or irregular size.

In such instances, the input product range checking engine 1010 can send data pertaining to those non-sub-primal cut type workpieces to, for instance, the pick-up station 820 such that the workpiece can be removed from the conveyor before it is further processed by the identification assembly 816 for identification. In another example, the input product range checking engine 1010 can send data pertaining to those non-sub-primal cut type workpieces to the sorter 822 such that the workpiece can be diverted from the identification process of the identification assembly 816. In either instance, the non-conforming workpieces may be removed from the workflow of the identification assembly 816, thereby speeding up the processing time of the identification assembly 816.

In some examples, the input product range checking engine 1010 can determine whether the scanned workpiece is a non-sub-primal cut type based only on scanned X-ray data, such as based on its object outline. In that regard, the X-ray data alone can be used to identify these non-conforming workpieces and remove the pieces from the workflow to speed up processing time. For example, the workpieces can be removed from the conveyor or otherwise diverted from processing before the workpiece is scanned by the optical scanning station 906 and before any matching and translating of X-ray and optical images occurs. In that regard, the workpieces can be removed from the conveyor or otherwise diverted from processing before the workpiece is scanned by the 906.

If the non-conforming workpieces are removed from the workflow, the above-described "X-ray-optical matching" process may be used to determine that a workpiece was removed based on the out of sequence X-ray and optical scan data. In addition, or in the alternative, the input product range checking engine 1010 can generate information for sending to other components of the processing system 804 (such as the portioner 818, the pick-up station 820, the sorter 822, the packager 824, etc.) to account for the diverted or otherwise removed workpiece.

Figure 11B:
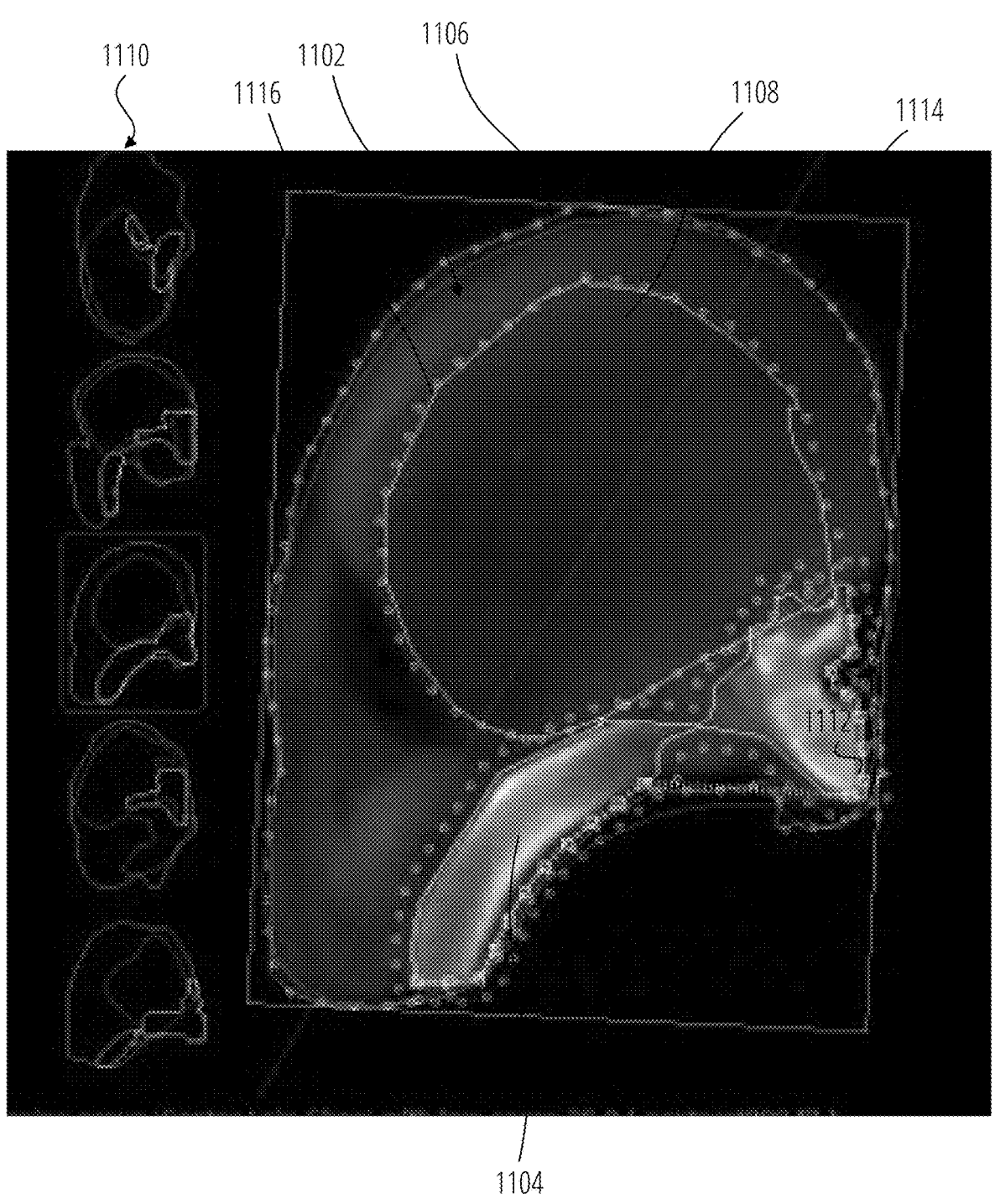
FIGS. 11B and 11C show screenshots of a registered scan of a sub-primal cut being aligned with a model associated with a type of sub-primal cut according to various aspects of the present disclosure.
Figure 11C:
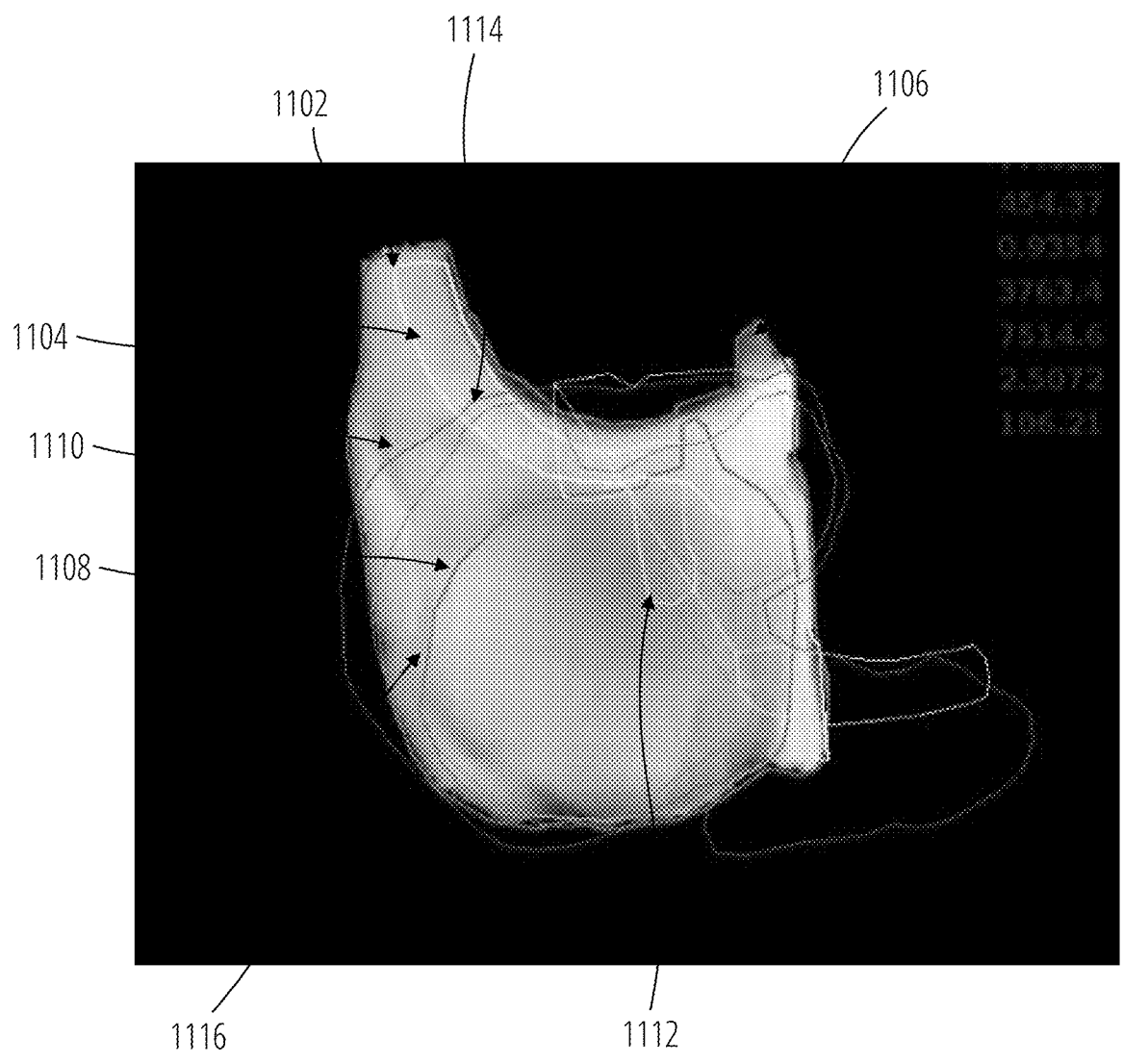

FIGS. 11B and 11C show computer-generated screenshots of a registered scan 1102 of sub-primal cuts generated by mapping at least first and second images of first and second scan types, such as from the X-ray scanning station 904 and the optical scanning station 906, wherein the same part numbers are used in FIGS. 11B and 11C for ease of reference. Each registered scan 1102 includes a mapped first scan of the first scan type (e.g., X-ray) showing a first match characteristic 1104 (e.g. a bone area or the overall outline or perimeter of the sub-primal cut), and a second scan of the second scan type (e.g., optical) showing a second match characteristic 1106 (e.g., the overall outline or perimeter of the sub-primal cut or the lean meat area). A third match characteristic 1108 (e.g., a lean meat area) may be shown in the registered scan 1102 by a scan of the second scan type or a third scan type.

As noted above, the registered scan 1102 of the workpiece may be generated by the scanning data processing engine 1008, which maps the X-ray image of the workpiece scanned at the X-ray scanning station 904 onto the (possibly transformed) optical image of the workpiece as scanned by optical scanner 906. In the examples shown, the registered scan 1102 of the sub-primal cut includes a first match characteristic 1104 that is a bone area defined by data from an X-ray image, a second match characteristic 1106 that is an overall outline or perimeter of the sub-primal cut defined by data taken from either the X-ray image or an optical image, and a third match characteristic 1108 that is a lean meat area taken from the optical image or another image from the optical scanner 906 or the third scanning station 910. The optical image may include a greyscale image, which may be a fat recognition (FRS) object view image or a laser scatter object view image generated by a feature recognition module based on data captured from the optical scanning station 906. In that regard, the FRS or laser scatter image can be used to identify a lean protein area of the sub-primal cut in addition to the outline or perimeter of the sub-primal cut.

The X-ray image is mapped onto the optical image to define at least first and second match characteristics in the registered scan 1102 after performing any necessary translations of the optical (or X-ray) image to account for any movement/shifting of the workpiece on the conveyor, as discussed above. Data in the X-ray image can be used to define the first match characteristic, such as bone area, and data in the optical scan can be used to show the second match characteristic, such as the overall outline of the sub-primal cut. The third match characteristic, such as lean protein area, can also be defined by data in the optical scan (such as the FRS or laser scatter image). In that regard, the third match characteristic can be defined in the registered scan 1102 without the need to map a third scan type, which improves processing time of the identification assembly 816.

The registered scan 1102 of the sub-primal cut is transmitted by the scanning data processing engine 1008 to the image matching engine 1012 for use in identifying/categorizing the sub-primal cut. The image matching engine 1012 compares the registered scan 1102 to a plurality of models, wherein each model is associated with a type of sub-primal cut, to identify the type of sub-primal cut.

In the screenshots of FIGS. 11B and 11C, the registered scan 1102 is shown being aligned with one of a plurality of models 1110a-1110e, wherein each model 1110a-1110e is associated with a type of sub-primal cut. Each model 1110a-1110e includes at least a first reference shape for detection of a first match characteristic by a first scan type of the registered scan and a second reference shape for detection of a second match characteristic by a second scan type of the registered scan. The at least first and second reference shapes of each model depend on the type of sub-primal cut associated with the model.

In the example shown in FIG. 11B, each of the models 1110a-1110e includes a first reference shape for detection of a first match characteristic defined by an X-ray scan, a second reference shape for detection of a second match characteristic defined by an optical scan, and a third reference shape for detection of a third match characteristic defined by the optical scan. The first, second, and third reference shapes are unique to each of the models 1110a-1110e based on the model's representation of an expected shape of one or more areas or characteristics of the associated sub-primal cut.

For instance, referring to FIG. 11B, model 1110c, which is shown mapped to the registered scan 1102, includes a first reference shape 1112 indicative of an expected shape of one or more bones of a center cut loin chop, a second reference shape 1114 indicative of an expected shape of an outline of a center cut loin chop, and a third reference shape 1116 indicative of an expected shape of a lean protein area of a center cut loin chop. Models 1110a, 1110b, 1110d, and 1110e include first, second, and third reference shapes (not separately labeled) indicative of an expected shape of one or more bones, an outline, and a lean protein area, respectively, of a sirloin center chop, a sirloin pinbone, a center rib chop, and a rib end chop, respectively.

In one example, one of the models is associated with a non-sub-primal cut type workpiece (such as a blade chop, trim and/or end piece of the primal cut) that does not meet the threshold criteria of a type of sub-primal cut. In such an instance, the blade chop, trim and/or end piece may be identified by the identification assembly 816 using the model associated with the trim and/or end piece of the primal cut. The non-sub-primal cut type model may be used in addition to or in lieu of the input product range checking engine 1010.

The models are a suitable computer-aided design (CAD) format, such as 2D format, for comparing reference shapes of the model to match characteristics (defined by image features) of the registered scan 1102. For instance, the models may be created with a computing device that is configured to run a CAD software program for creating 2D and/or 3D designs. A user interacting with the CAD software program may draw or otherwise generate the models with tools in the program based on accumulated data regarding the shapes, outlines, etc., of the various sub-primal cut types being represented by the models. More specifically, a user may interact with the CAD software program to draw or generate (using tools in the program) at least a first reference shape and a second reference shape for each model, such as an entire object outline of a sub-primal cut being represented by the model and a bone area of the sub-primal cut being represented by the model. For ease of reference, each reference shape may be distinguished by a different color, line format, etc.

For instance, the CAD software program may be configured to import scan data showing sub-primal cut characteristics that can be represented by various reference shapes in the model. For instance, the CAD software program may be able to process matched X-ray and optical scan data of a sub-primal cut, and based on that matched scan data, generate a model having at least first and second reference shapes representing first and second match characteristics of the sub-primal cut. For instance, the X-ray data may be used to define a first reference shape of the model indicative of an outline of the sub-primal cut, the X-ray and/or optical data may be used to define a second reference shape in the model indicative of a bone area of the sub-primal cut, and the optical data may be used to define a third reference shape in the model indicative of a lean protein area of the sub-primal cut.

In other examples, the models may be created automatically using one or more machine learning models. For instance, an identification image generation engine 826 of the model generation computing device 806 may use one or more machine learning models stored in a model data store 838 to generate models as output based on images of a plurality of scans (such as the registered scans) as input. The plurality of scans, which may be retrieved from an image/attribute data store 834 of the model generation computing device 806, can be used to create training data (stored in a training data store 836) to train the machine learning models to generate models for each type of sub-primal cut.

In some examples, the training data for training the machine learning models may include using the scans from one of the scanning stations described herein (such as the X-ray and optical scanners). In some examples, one or more additional scanners or cameras may be used to gather scan data. In that regard, the sub-primal cuts may first be scanned on a scanning conveyor used to capture scan data for training one or more of the machine learning models. In other examples, one or more additional scanners or cameras may be incorporated into the processing system 804. The one or more additional scanners or cameras may include a low complexity camera configured to capture a visible light image of the sub-primal cut for defining the outline reference shape of the model, such as when only outline data is needed to generate the model or when it can be combined with the X-ray data in a less complex manner.

The image matching engine 1012 of the optimization computing device 902 is configured to align the registered scan 1102 with each of the models 1110a-1110e to determine which of the plurality of models 1110a-1110e most closely matches or aligns with the registered scan 1102 and how closely the registered scan 1102 matches each model. In that regard, the image matching engine 1012 may run an image matching/image recognition algorithm (hereinafter sometimes simply referred to as "translation algorithm(s)") configured to align at least one of the reference shapes of each model with corresponding match characteristic(s) of the registered scan.

In one example, the image matching engine 1012 is configured to run a translation algorithm for each model of the plurality of models that includes concurrently aligning the first reference shape of the model to the first match characteristic of the first scan type and the second reference shape of the model to the second match characteristic of the second scan type (and optionally the third reference shape of the model to the third match characteristic of the second or third scan type). The image matching engine 1012 may process the alignment data, including calculating a plurality of shape match values based on the alignment of the first and second (and optionally third) match characteristics with the first and second (and optionally third) reference shapes.

For instance, for model 1110c, the first reference shape 1112 may be aligned with the first match characteristic 1104 of the registered scan 1102 while the second reference shape 1114 is concurrently aligned with the second match characteristic 1106. Further, the third reference shape 1116 may be aligned with the third match characteristic 1108 of the registered scan 1102 while concurrently aligning the first and second reference shapes 1112 and 1114 with the first and second match characteristics 1104 and 1106.

The translation algorithm for concurrent alignment of the reference shapes of the model to the match characteristics of the registered scan may be carried out by the image matching engine 1012 using various techniques. For instance, the image matching engine 1012 may perform at least one of resizing the model, rotating the model, flipping or mirroring the model, distorting the model, shifting the model, etc. ("translating the model"), until the reference shapes of the model substantially align the match characteristics in the registered scan. Conversely or additionally, the image matching engine 1012 may perform at least one of resizing the registered scan, rotating the registered scan, flipping or mirroring the registered scan, distorting the registered scan, shifting the registered scan, etc. ("translating the registered scan"), until the match characteristics in the registered scan substantially align the reference shapes of the model.

In one example, the image matching engine 1012 performs a translation algorithm of at least one of the model and the reference scan that includes reducing or minimizing an area difference between the reference shape(s) of the model and the corresponding match characteristic(s) of the reference scan (sometimes hereinafter referred to as a "same matching area process") within a threshold level of area difference. For instance, the same matching area process may include similar transformation or translation techniques discussed in U.S. patent Ser. No. 10/654,185 for aligning an X-ray scan with an optical scan to account for any movement/shifting of the workpiece on the conveyor. For instance, the same matching area process may include one or more of the following: directional translation of the model and/or the reference scan; rotational translation of the model and/or the reference scan; scaling the size of the model and/or the reference scan; and shear distortion of the model and/or the reference scan.

In some examples, the image matching engine 1012 performs a translation algorithm that includes the same matching area process performing a point-to-point distance reducing process. For instance, the point-to-point distance reducing process may be used to reduce the distance between points on the reference shape(s) of the model and the corresponding match characteristic(s) of the reference scan (see, e.g., points shown on the model 1110c in FIG. 11B). The point-to-point distance reducing process may be carried out using one or more optimization modules of the image matching engine 1012 using known techniques to minimize the distance between two points within a threshold level of distance. The point-to-point distance reducing process may be used in the alternative or in addition to the same matching area process to further increase the accuracy of the model to reference scan match.

The point-to-point distance reducing process and/or the same matching area process may be performed to concurrently align the first reference shape of the model to the first match characteristic and the second reference shape of the model to the second match characteristic (and optionally the third reference shape of the model to the third match characteristic), as discussed above. The point-to-point distance reducing process and/or the same matching area process may also or additionally be performed to align only one of the first, second, or third reference shapes of the model to the corresponding match characteristic of the registered scan (such as an outline shape match), as will be discussed further below.

The processing time of the image matching engine 1012 using the point-to-point distance reducing process and/or the same matching area process can be done at a speed that supports the processing speed of the sub-primal cuts in the processing system 804, such as 250 ms or less per workpiece. In some instances, using the point-to-point distance reducing process and/or the same matching area process can be done even faster than using machine learning or other automated intelligence, and much faster than what could be supported by a human identifying the types of sub-primal cuts. In that regard, the scan types used in the systems and methods described herein exclude any type of scanning that could be done by human observation, which would not support the needed processing speed of the sub-primal cuts in the processing system 804.

Data pertaining to the alignment of the reference shapes of the model with the match characteristics of the registered scan may be used by the classification engine 1014 to generate shape match values indicative of the alignment of the model and the registered scan, which may be stored in and retrievable from the shape match/attribute data store 1018 of the optimization computing device 902.

The shape match values may be based on a measurement of overlap of each reference shape of the model to the corresponding match characteristics in the registered scan. For instance, the shape match values may be based on the percentage out of shape (or in shape) between at least one of the first, second, and third model reference shapes and the corresponding first, second, and third match characteristics of the registered scan during alignment. For instance, an out-of-shape value may be determined as percentage, where 0% is a perfect match between the model reference shape(s) and the match characteristic(s) of the registered scan. The out-of-shape value may be determined, for instance, based on the percentage or area of each reference shape that overlaps with the area of the corresponding match characteristic.

In one example, the shape match values may be calculated each time at least one of the reference shapes of the model and the registered scan are translated to align the reference shapes of the model to the match characteristics of the registered scan. As an example, if reference shapes of a model were 31% out of alignment with corresponding matching characteristics in a registered scan in a first rotation and alignment of the model (a "first configuration"), the model may be given a match shape value of 8 for that first configuration. By comparison, if reference shapes of the model were only 11.2% out of alignment with corresponding matching characteristics in the registered scan in a second rotation and alignment of the model (a "second configuration"), the model may be given a match shape value of 3 for that second configuration. The match shape values may be averaged to designate a model match score indicative of alignment of the reference shapes of the model with the match characteristics of the registered scan, which may also be stored in and retrievable from the shape match/attribute data store 1018 of the optimization computing device 902.

In one example, the shape match values may be calculated after a final translation of the reference shapes of the model and/or the registered scan. For instance, the image matching engine 1012 may determine a best or final alignment of the reference shapes of the model with the match characteristics of the registered scan based on the % out of alignment of the model and registered scan in various rotations/alignments. The shape match values may then be calculated in that final aligned configuration of the model and registered scan. The shape match values may instead be determined in any other suitable manner.

In one example, the shape match values may also be based on one or more algorithms run by an optimization module of the image matching engine 1012, such as values generated during the point-to-point distance reducing process and/or the same matching area process discussed above or during one or more other image matching/image recognition algorithms ("translation algorithm(s)"). In that regard, the shape match values may include a model match "score" of the registered scan with each model of the plurality of models. The various shape match values (e.g. the out-of-shape values and the model match score) may be either normalized to correspond with other shape match values and/or weighted according to their importance in determining alignment of the model and the registered scan.

In some examples, the shape match values and/or the corresponding model match score may be dependent on prioritization or importance of alignment of one or more of the reference shapes of the model with one or more of the match characteristics of the registered scan. For instance, in some instances, it may be more important that the outline match characteristic of the registered scan aligns with the outline reference shape of the model compared to the lean area and/or the bone area. Similarly, in some instances, it may be more important that the bone area match characteristic of the registered scan aligns with the bone area reference shape of the model compared to the lean area and/or the outline area. In that regard, the identification assembly 816 may be used to assign a weight to matching of the first reference shape to the first match characteristic that is greater than a weight assigned to matching of the second (and optionally third) reference shape to the second (and optionally third) match characteristic for calculating. The assigned weights can then be factored into calculation of the match shape values and/or the model match score.

In some examples, a user of the processing system 804 may set weight preferences for the alignment of one or more of the reference shapes of the model with one or more of the match characteristics of the registered scan through a user interface of the optimization computing device 902 (generated, for instance, by the image matching engine 1012). For instance, the user may navigate to a window that includes sliders or toggle bars to set the importance for each shape/ characteristic alignment. The importance of each shape/ characteristic alignment may be independently controllable or instead dependent on the weight or importance value given to at least one of the other shapes/characteristics.

In some examples, the image matching engine 1012 may automatically assign a weight for each shape/characteristic alignment based on characteristics of the supply of raw, incoming workpieces transmitted, for instance, from a raw workpiece supply/demand engine 830 of a workpiece utilization computing device 808, requirements of finished workpieces transmitted, for instance, from a finished workpiece supply/demand engine 832 of the workpiece utilization computing device 808, or other criteria. In some examples, the image matching engine 1012 uses one or more machine learning models stored in a model data store 1022 to assign a weight for each shape/characteristic alignment as output based on the characteristics of the supply of raw, incoming workpieces, the requirements of finished workpieces transmitted, or other criteria as input.

As discussed above, in one example the image matching engine 1012 concurrently aligns all the reference shapes of the model to all the corresponding match characteristics of the registered scan to determine shape match values. In other examples, the image matching engine 1012 is configured to run a translation algorithm that includes aligning less than all the reference shapes of each model with the corresponding match characteristics of the registered scan before aligning the remaining or all of reference shapes for each model with the corresponding match characteristics. As a specific example, the translation algorithm may include first conducting an outline shape matching of the models with the registered scan before aligning one or more of the other model reference shapes with the corresponding match characteristics of the registered scan.

In one instance, the translation algorithm may include aligning a reference shape indicative of an expected shape of an outline of a sub-primal cut (such as second reference shape 1114) of each model with a match characteristic of the registered scan indicative of the entire object outline of the sub-primal cut (such as second match characteristic 1106) and generating a first match shape value(s) based on this first alignment. The shape match value(s) may be based on a measurement of overlap of the second reference shape of the model to the second match characteristic in the registered scan, such as the percentage out of shape, as discussed above.

After alignment of the first reference shape with the first match characteristic, the translation algorithm may include next concurrently aligning the first and second (and optionally third) reference shapes with the first and second (and optionally third) match characteristics, as described above to generate a second match shape value(s). In some examples, after alignment of the first reference shape with the first match characteristic, the translation algorithm may include further aligning only a second (and optionally third) reference shape with the second (and optionally third) match characteristic because the first reference shape was aligned with the first match characteristic during a first step of the translation algorithm. The second match shape value(s) may be calculated based on the further alignment and added into or otherwise combined with the first match shape value to preliminarily determine a model match the registered scan 1102.

A non-limiting example of generated shape match value(s) (including first shape match values represented as out-of-shape values and second shape match values represented as a model match score) for a registered scan (such as registered scan 1102) for each model (such as models 1110a-1110e) is shown in the below exemplary matrix.

TABLE 1

| Model/Standard | Out of Shape (%) | Model Match Score |
|---|---|---|
| Sirloin Center Chop | 31.0 | 97.7 |
| Sirloin Pinbone | 11.2 | 51.8 |
| Center Cut Loin Chop | 16.0 | 49.4 |
| Center Rib Chop | 28.5 | 80.6 |
| Rib End Chop | 23.6 | 84.7 |

To generate the data in the matrix shown in Table 1, the image matching engine 1012 may be configured to run a translation algorithm for each model that includes aligning at least one reference shape of the model (such as the outline reference shape of the model or the second reference shape 1114) with the corresponding match characteristic(s) of the registered scan (such as second match characteristic 1106) and generating a first match shape value(s), e.g., out of shape percentage (%) based on this first alignment. Based on this alignment, the Sirloin Pinbone model has a shape match value (out of shape percentage) of only 11%, whereas the Center Cut Loin Chop model has a shape match value of 16%, and the other models have even higher shape match value (out of shape percentage). The translation algorithm may be run again to concurrently align the first and second (and optionally third) reference shapes of each model with the first and second (and optionally third) match characteristics of the registered scan 1102. A second match shape value(s), e.g., a model match score, may be calculated based on the concurrent alignment of the first and second (and optionally third) reference shapes of each model with the first and second (and optionally third) match characteristics of the registered scan 1102.

In some instances, the model match score will correlate to the to the out-of-shape values. However, such a correlation may not always be true. For example, the model match score in the matrix of Table 1 for the Sirloin Pinbone model is 51.8 (with a percentage out of shape of only 11.2%), whereas the model match score for the Center Cut Loin Chop model is 49.4 (with a higher percentage out of shape of 16%). For instance, the match characteristic indicating the entire object outline of the registered scan may most closely match the outline reference shape of the Sirloin Pinbone model, but the match characteristic indicating the bone area and/or lean protein area may more closely match the Center Cut Loin Chop model. Such a match deficit may occur if the model is scaled up or down to match certain references shapes to the match characteristics. In that regard, additional data pertaining to attribute characteristics of the sub-primal cut would be beneficial for determining a best model match for the sub-primal cut.

Moreover, a sub-primal cut may not include all the attributes of a certain type of sub-primal cut even if the sub-primal cut is shaped like a certain type of cut. For instance, a sub-primal cut may be shaped like a sirloin cut, but the sub-primal cut may not have the appropriate number of bones, bone to meat ratio, fat percentage, etc., to qualify as a sirloin cut. In that regard, each model also includes a plurality of attribute characteristic value ranges for determining whether a sub-primal cut has characteristics of a certain type of sub-primal cut.

In one example, the shape match value(s) (e.g., % out of shape and the model match score) may be added to or otherwise combined with an attribute score to determine a total overall score for the model. The attribute score may be calculated from attribute match values generated from an analysis of a plurality of identified attribute characteristics of the sub-primal cut compared to a plurality of attribute characteristic value ranges identified for each model. The shape match value(s) and/or the attribute score may be normalized and/or weighted according to their importance in determining a best model match for the registered scan.

The attribute characteristics represent certain aspects of the sub-primal cut that may be further used to determine a best model match for the sub-primal cut. For instance, attribute characteristics of the sub-primal cut may include height (or thickness), weight, bone quantity, bone area, bone length, bone edge offset, bone to meat ratio, percentage of fat v. lean, concavity, flatness, roundness, complexity of outline, primary axis, lean complexity, blood spots, holes, bruises, parasites, unwanted bones, etc.

The attribute characteristics of the sub-primal cut may be determined by the attribute data engine 1014 from at least one of the scans used to generate the registered scan. In that regard, the attribute data engine 1014 may receive or retrieve scanned images from one of the scanning data processing engine 1008 and the sub-primal image data store 1018 for use in determining attribute characteristics.

In one example, the bone length and area of a sub-primal cut may be determined based on one or more measurements of the bone area shown in the X-ray scan image, and the number of bones of a sub-primal cut may be determined based on a count of the number of bone areas shown in the X-ray image. As another example, the bone edge offset of a sub-primal cut may be based on one or more measurements of the bone area shown in the X-ray scan image compared to its location relative to the object outline determined from the X-ray or optical scan. As another example, the bone to meat ratio of a sub-primal cut may be based on one or more measurements of the bone area shown in the X-ray scan image compared to the measured area of the entire cut as determined by the X-ray or optical scan.

As yet another example, the percentage of fat v. lean of a sub-primal cut may be based on images generated by and analyzed by a feature recognition module using the optical scans. For instance, a feature recognition module (of the scanning data processing engine 1008 or alternatively/additional of the attribute data engine 1014) may be used to generate and/or analyze an optical image to determine the percentage of fat v. lean of a sub-primal cut. For instance, the percentage of fat v. lean of a sub-primal cut may be based on color differentiation (e.g., white areas v. gray/black areas)) in a greyscale image, like the "Normal FRS Object View" image shown in FIG. 11A.

In addition, or in the alternative, a feature recognition module may be used to determine the percentage of fat v. lean of a sub-primal cut based on an analysis of a height across the top area of the sub-primal cut using a height mode object view, like the "Height Mode Object View" image shown in FIG. 11A. Over time lean sections of a pork chop will slump down, whereas the bone does not slump, and whereas fat sections may slump according to its hardness or other factors. Accordingly, the feature recognition module may be used to determine the percentage of fat v. lean of a sub-primal cut based on the measured height profile of the sub-primal cut.

Any number of attribute characteristics of the sub-primal cut may be determined by the attribute data engine 1014 from at least one of the scans used to generate the registered scan. As yet another example, each of the models associated with a type of sub-primal cut may include a region of interest (ROI) associated with at least one of a match characteristic and an attribute characteristic. The ROI may be defined, at least in part, by scan data pertaining to the match characteristics and/or attribute characteristics. For instance, an ROI may be defined for a bone area, a fat streak area, etc., based on accumulated scan data identifying attributes pertaining to those regions. The ROIs may be identified for each model manually or automatically, such as by using the scanning data processing engine 1008 and/or one or more machine learning models.

The ROIs may be used, for instance, to target the identification of attribute characteristics when processing a registered scan with the identification assembly 816. For instance, the ROI may be used to search for a specific attribute of the sub-primal cut shown in registered scan in the ROI associated with that attribute. In some examples, the ROI may be used to perform a refined analysis of the registered scan, e.g., to look for certain attributes only in designated ROIs after an initial analysis is performed to identify at least some of the attribute characteristics.

Attribute characteristic data is transmitted to the attribute data engine 1014 for comparing to the plurality of attribute characteristic value ranges identified for each model. Attribute characteristic data may also be stored and retrievable from a shape match/attribute data store 1018 of the optimization computing device 902.

The attribute characteristic value ranges may be identified for each model manually, such as by a user setting value ranges through a user interface of the optimization computing device 902 (generated, for instance, by the attribute data engine 1014). For instance, the user may navigate to a window that includes input boxes for adding a value range(s) for certain attribute characteristics that are preselected for the model, selected from a list, added manually, etc.

In some examples, the attribute data engine 1014 may automatically assign attribute characteristic value range(s) based on characteristics of the supply of raw, incoming workpieces transmitted, for instance, from the raw workpiece supply/demand engine 830 of the workpiece utilization computing device 808, requirements of finished workpieces transmitted, for instance, from the finished workpiece supply/demand engine 832 of the workpiece utilization computing device 808, or other criteria.

In some examples, an attribute data generation engine 828 of computer readable medium 840 of the model generation computing device 806 uses one or more machine learning models stored in a model data store 838 to define attribute characteristic value range(s) as output based on the characteristics of the supply of raw, incoming workpieces, the requirements of finished workpieces transmitted, or other criteria as input (received from, for instance, the workpiece utilization computing device 808).

In some examples, the attribute data generation engine 828 uses one or more machine learning models stored in the model data store 838 to define attribute characteristic value range(s) as output based on measured attribute data for certain types of sub-primal cuts as input. For instance, when a sub-primal cut is identified as a certain type (e.g., sirloin), the measured or identified attribute data for that sub-primal cut can be stored in an image/attribute data store 834 of the model generation computing device 806 and categorized based on where it falls within the attribute characteristic value range(s) for that type (e.g., sirloin cut 1 v. Sirloin cut 2). The categorization data of the sub-primal cuts cut can be used to define attribute characteristic value range(s) for the model of that type of sub-primal cut. The machine learning models may be trained to define attribute characteristic value range(s) for each model using measured attribute data for certain types of sub-primal cuts as training data (stored in a training data store 836).

In some examples, the attribute match values determined from reference of identified attribute characteristics to the attribute characteristic value ranges may depend on prioritization or importance of certain attribute characteristics. For instance, in some instances, it may be more important that the sub-primal cut have less than a certain number of bones or fat compared to other attributes, such as the bone to edge distance, the bone length, etc. Accordingly, the attribute match values of such higher importance attributes can be weighted higher than other attributes in generating the attribute score. Moreover, as noted above, the attribute score in general may be given a higher weight than the match shape values based user preferences or other data.

For instance, a user of the processing system 804 may set weight preferences for the attribute match values through a user interface of the optimization computing device 902 (generated, for instance, by the image matching engine 1012). For instance, the user may navigate to a window that includes sliders or toggle bars to set the importance for each attribute match value. The importance of each attribute match value may be independently controllable or instead dependent on the weight or importance value given to at least one of the other attribute match values.

In some examples, the image matching engine 1012 may automatically assign a weight for each attribute match value based on characteristics of the supply of raw, incoming workpieces transmitted, for instance, from a raw workpiece supply/demand engine 830 of a workpiece utilization computing device 808, requirements of finished workpieces transmitted, for instance, from a finished workpiece supply/demand engine 832 of the workpiece utilization computing device 808, or other criteria. In some examples, the image matching engine 1012 uses one or more machine learning models stored in a model data store 1022 to assign a weight for each attribute match value as output based on the characteristics of the supply of raw, incoming workpieces, the requirements of finished workpieces transmitted, or other criteria as input.

The attribute characteristic value ranges for each model are transmitted to the attribute data engine 1014 for comparing to the plurality of attribute characteristics for each registered scan to generate the attribute match values. Attribute characteristic value ranges may also be stored and retrievable from the shape match/attribute data store 1018 of the optimization computing device 902.

Data pertaining to identified attribute characteristics of a registered scan falling within or otherwise compared to attribute characteristic value range(s) of a model may be used by the attribute data engine 1014 to generate the attribute match values for each model. Generation or calculation of the attribute match values may be based on at least one of whether measured properties of each of the identified plurality of attribute characteristics falls within a corresponding attribute characteristic value range, deviation of measured properties of each of the identified plurality of attribute characteristics from the corresponding attribute characteristic value range, deviation of measured properties of each of the identified plurality of attribute characteristics from at least one of a corresponding average attribute characteristic value and a corresponding median attribute characteristic value. As noted above, a weight may be assigned to one or more attribute characteristics based on its importance in determining a model match of the registered scan.

Moreover, in some examples, the attribute match values and/or the attribute score may be used to identify a non-sub-primal cut type workpiece (such as a blade chop, trim and/or end piece of the primal cut) because the attribute characteristics of the workpiece do not meet threshold criteria of a type of sub-primal cut. For instance, the blade chop, trim and/or end piece may be identified by the identification assembly 816 because it has a thickness or height, a mass, a lack of bones, or a weight that is outside any value ranges of a type of sub-primal cut. In such instances, the non-sub-primal cut type may be identified as blade chop, trim, etc., even without any model matching. Use of attribute match values and/or the attribute score may be used to identify a non-sub-primal cut type workpiece in addition to or in lieu of the input product range checking engine 1010.

The attribute data engine 1014 may process the attribute match values with one or more algorithms to generate an attribute "score' of the registered scan for each model of the plurality of models. The attribute score may be calculated using any well-known mathematical methods, such as by simply combining the values (optionally after normalization of the values and/or weighting). In one example, the attribute score may simply include a sum of first and second (and optionally third, fourth, etc.) measured properties of first and second (and optionally third, fourth, etc.) identified attribute characteristics, such as the thickness of the workpiece and the weight of the workpiece.

The attribute match values for each model may be stored in and retrievable from the shape match/attribute data store 1018 of the optimization computing device 902. The classification engine 1014 receives the attribute score for each model and calculates a total "best model match" score for the model. More specifically, the attribute score for a model is added to or otherwise combined with the shape match values (e.g., % out of shape and the model match score) for that model to determine a total score for the model. The total score may be calculated using any well-known mathematical methods, such as by simply combining the values (optionally after normalization of the values and/or weighting).

The classification engine 1014 compares the total score for each model to the total score for the other models, and the lowest (or in some instances the highest) total score indicates a best model match, which is the type of sub-primal cut that should be assigned to the sub-primal cut of the registered scan. For instance, a lowest total score may indicate a lowest cost of the sub-primal cut when matched to a type of sub-primal cut (from a cost-optimizer module, for instance).

A non-limiting example of identification process results (e.g., out of shape values, a model match score, an attribute score, and a total overall score) for a registered scan (such as registered scan 1102) compared to each model (such as models 1110*a*-1110*e*) is shown in the below exemplary matrix of Table 2, which builds upon the matrix shown in Table 1 above by additionally included an attribute score and a total score.

TABLE 2

| Model/Standard | Out of Shape (%) | Model Match Score | Attribute Score | Total Score |
|---|---|---|---|---|
| Sirloin Center Chop | 31.0 | 97.7 | 5.3 | 134.0 |
| Sirloin Pinbone | 11.2 | 51.8 | 3.8 | 66.8 |
| Center Cut Loin Chop | 16.0 | 49.4 | 2.0 | 67.4 |
| Center Rib Chop | 28.5 | 80.6 | 5.6 | 114.7 |
| Rib End Chop | 23.6 | 84.7 | 3.1 | 111.4 |

As can be appreciated, the registered scan used to generate the matrix of Table 2 most closely matches the Sirloin Pinbone model, with a total score of 66.8, compared to higher scores for the other models. Accordingly, the Sirloin Pinbone model is identified as or assigned as the type of sub-primal cut for the sub-primal cut of the registered scan.

At least one of the shape match values, attribute score, and the total overall score may be used to further assign a categorization of the type of sub-primal cut for the sub-primal cut. For instance, if the total score for a model falls within a certain range, it may be categorized as a sub-primal cut 1 v. a sub-primal cut 2. Referring to one of the specific examples discussed above, the first chop 108 shown in FIG. 2 includes a spinalis 208 that is greater than a certain size and a certain quantity of bones, which can affect the attribute score and therefore the total score. Accordingly, the categorization of rib eye assigned to the first chop 108 may be a rib eye chop 1 v. rib eye chop 2. The type of chop (e.g., rib eye v. center cut) and the categorization of the chop (e.g., rib eye chop 1 v. rib eye chop 2) can ultimately determine how the chop is used (e.g., sorted, packaged, etc.) for value sorting and/or value optimizing use of the chops. The categorization data can also be used as input in one or more machine learning models for automatically generating attribute characteristic value range(s) for each model, as discussed above.

In some instances, the total score for a model (and/or any of the individual values or scores making up the total score) will fall within a certain range for a first type of sub-primal cut, but if within a certain tolerance of that range, it may be assigned to a second type of sub-primal cut having a different range. Such re-assignment of the type of sub-primal cut may be based on requirements of finished workpieces transmitted, for instance, from a finished workpiece supply/demand engine 832 of the workpiece utilization computing device 808, or other criteria. For instance, if a sub-primal cut is assigned as a sirloin pinbone and is within a certain tolerance of at least one of the ranges of values/scores, but there is a higher demand for a center cut loin chop, the sub-primal cut may instead be assigned as a center cut loin chop. Such a tolerance may be set either manually by a user (using a "bump check" module or similar) or automatically by the classification engine 1016 and/or one or more machine learning models used by the classification engine 1016.

FIG. 12 is a flowchart that illustrates a non-limiting example of a method 1222 of determining a type of sub-primal cut for a sub-primal cut, which may be carried out by one or more engines of the optimization computing device 902. The method 1222 may be carried out for sub-primal cuts being conveyed along a conveyor of a processing system, such as processing system 804.

From a start block, the method 1222 proceeds to block 1202, where the processor(s) 1002 of the optimization computing device 902 obtains a plurality of models, each associated with a type of sub-primal cut. The plurality of models may be generated, for instance, using one or more machine learning models, or using other methods, such as manually with a computing device that is configured to run a CAD software program for creating 2D and/or 3D designs. The plurality of models may be stored in the sub-primal image data store 1018 for retrieval by the image matching engine 1012 when carrying out further aspects of the method.

Each model of the plurality of models includes at least a first reference shape for detection of a first match characteristic by a first scan type and a second reference shape for detection of a second match characteristic by a second scan type. For instance, each model may include a first reference shape indicative of an expected shape of one or more bones of a sub-primal cut, a second reference shape indicative of an expected shape of an outline of a sub-primal cut, and a third reference shape indicative of an expected shape of a lean protein area of a sub-primal cut, such as shown in the exemplary model 1110C of FIG. 11B. The models may include any other combination of reference shapes.

The reference shapes of the model help to determine whether a sub-primal cut is shaped like a certain type of cut; however, the sub-primal cut may not include all the attributes of a certain type of sub-primal cut. For instance, a sub-primal cut may be shaped like a sirloin cut, but the sub-primal cut may not have the appropriate number of bones, bone to meat ratio, fat percentage, etc., to qualify as a sirloin cut. In that regard, each model also includes a plurality of attribute characteristic value ranges for determining whether the sub-primal cut has attribute characteristics of that type of sub-primal cut. The attribute characteristic value ranges may be identified for each model manually or automatically, such as by using one or more machine learning models.

At block 1204, the processor(s) 1002 of the optimization computing device 902 receives a registered scan of a sub-primal cut including a first scan of the first scan type showing the first match characteristic and a second scan of the second scan type showing the second match characteristic. The registered scan may be generated by the scanning data processing engine 1008 upon receiving scan data from at least first and second scanners (such as the optical scanning station 906 and the X-ray scanning station 904). For instance, the registered scan may be defined by an X-ray image showing a first match characteristic (e.g., a bone area) mapped to an optical image showing a second match characteristic (e.g., an object outline), as shown in the exemplary registered scan 1102 of FIG. 11B. The registered scan 1102 may also include a third scan of the second or a third scan type showing a third match characteristic. For instance, the third scan may be an FRS image generated from the optical scan showing, for instance, the lean protein area of the sub-primal cut, as shown in the exemplary registered scan 1102 of FIG. 11B. The registered scan may include any other combination of scan types and/or match characteristics. The registered scan may be stored in the sub-primal image data store 1018 for retrieval by the image matching engine 1012 when carrying out further aspects of the method.

At block 1206, the optimization computing device 902 identifies a plurality of attribute characteristics for the sub-primal cut using at least one of the first and second scan types of the registered scan. For instance, the attribute data engine 1014 may identify a bone area, bone quantity, bone to edge offset, etc. from an X-ray scan, an object outline from the X-ray or an optical scan, a fat percentage from an FRS image generated by the optical scan, a thickness based on a height map generated by the optical scan, etc. The attribute characteristic data may be stored in a shape match/ attribute data store 1020 for retrieval by the classification engine 1016 when carrying out further aspects of the method.

Blocks 1210, 1212, and 1214 of the method 1222 are carried out for a model beginning at block 1208 before proceeding to carry out the steps at blocks 1210, 1212, and 1214 for the next model at block 1216.

At block 1210, for each model, the optimization computing device 902 aligns at least a first reference shape of the model to a corresponding match characteristic(s) of the registered scan. For instance, the optimization computing device 902 may concurrently align at least first and second reference shapes of the model to at least first and second match characteristics of the registered scan. In that regard, the image matching engine 1012 may run a translation algorithm for each model of the plurality of models that includes concurrently aligning the first reference shape of the model to the first match characteristic of the first scan type and the second reference shape of the model to the second match characteristic of the second scan type (and optionally the third reference shape of the model to the third match characteristic of the third scan type). Before block 1210, for each model, the optimization computing device 902 may run a translation algorithm that includes first conducting an outline shape matching of the models with the registered scan before concurrently aligning one or more of the other model reference shapes with the corresponding match characteristics of the registered scan.

At block 1212, for each model, the image matching engine 1012 may process the alignment data, including, for instance, calculating a plurality of shape match values based on the outline shape matching of the models with the registered scan and the concurrent alignment of the first and second (and optionally third) match characteristics with the first and second (and optionally third) reference shapes. Data pertaining to the alignment of the reference shapes of the model with the match characteristics of the registered scan may be used by the classification engine 1014 to generate shape match values indicative of the alignment of the model and the registered scan, which may be stored in and retrievable from the shape match/attribute data store 1020 of the optimization computing device 902.

The shape match values may be based on a measurement of overlap of each reference shape of the model to the corresponding match characteristics in the registered scan. In that regard, the shape match values may include a value indicating the percentage out of shape (or in shape) between the outline shape of the model and the registered scan, and/or based on the percentage out of shape (or in shape) between the first, second, and third model reference shapes and the first, second, and third match characteristics during concurrent alignment. The shape match values may also include a model match "score' generated by one or more optimization modules of the registered scan 1102 based on the concurrent alignment of the first, second, and third model reference shapes and the first, second, and third match characteristics (such as based on the point-to-point distance reducing process and/or the same matching area process). In some examples, the out of shape values and/or the model match score may be dependent on prioritization or importance of alignment of one or more of the reference shapes of the model with one or more of the match characteristics of the registered scan.

In one example, the shape match values may be calculated each time at least one of the reference shapes of the model and the registered scan are translated to align the reference shapes of the model to the match characteristics of the registered scan. In another example, the shape match values may be calculated after a final translation of the reference shapes of the model and/or the registered scan.

At block 1214, for each model, the optimization computing device calculates a plurality of attribute match values based on the identified plurality of attribute characteristics for the sub-primal cut compared to attribute characteristic value ranges of the model. Data pertaining to identified attribute characteristics of a registered scan falling within or otherwise compared to attribute characteristic value range(s) of a model may be used by the attribute data engine 1014 to generate attribute match values for each model. For instance, the attribute data engine 1014 may process attribute match values with one or more algorithms to generate an attribute "score' of the registered scan for each model of the plurality of models. In some examples, the attribute match values and/or the attribute "score' may be dependent on prioritization or importance of one or more of the attribute characteristics. The attribute match values for each model may be stored in and retrievable from the shape match/attribute data store 1018 of the optimization computing device 902.

At block 1218, the optimization computing device 902 determines a best match between the models and the registered scans using the match shape values and the attribute match values. For instance, the classification engine 1016 may combine the out of shape values for each model, the model match "score' for each model, and the attribute score for each model to calculate a total "best model match" score for the model.

At block 1218, the optimization computing device 902 assigns a type of sub-primal cut to the sub-primal cut based on the best model match. For instance, the classification engine 1016 may compare the total score for each model to the total score for the other models, and the lowest (or in some instances the highest) total score indicates a best model match, which is the type of sub-primal cut that should be assigned to the sub-primal cut of the registered scan.

Once the type of sub-primal cut is identified, the sub-primal cut may be further processed according to its type. For instance, if the sub-primal cut is identified as a certain type, it may be designed for trimming, for packaging in a certain package, etc. In some instances, the best model match score may indicate that the sub-primal cut is a non-sub-primal cut type workpiece (such as a blade chop, trim and/or end piece of the primal cut) that does not meet the threshold criteria of a type of sub-primal cut. For instance, the best model match score may be outside a range of acceptable scores for identifiable types of sub-primal cut. In such instances, the non-sub-primal cut type workpiece may be diverted from further processing, picked-up, etc.

FIG. 13 is a flowchart that illustrates a non-limiting example of a method 1302 for using one or more machine learning models to generate a plurality of models each associated with a type of sub-primal cut, which may be carried out by one or more engines of the model generation computing device 806. The method 1302 may be carried out to generate models for use by the optimization computing device 902 in identifying a type of sub-primal cut being conveyed along a conveyor of a processing system, such as processing system 804.

From a start block, the method 1302 proceeds to block 1304, where the identification image generation engine 826 of the model generation computing device 806 receives registered scans of a plurality of sub-primal cuts, each of the registered scans including a first scan of the first scan type showing the first match characteristic for the sub-primal cut and a second scan of the second scan type showing the second match characteristic for the sub-primal cut. The registered scans may be stored and/or retrieved from the image/attribute data store 834 of the model generation computing device 806.

At block 1306, the identification image generation engine 826 uses one or more machine learning models to generate a model for each type of sub-primal cut using the registered scans as input. Each generated model includes a first reference shape representing the first match characteristic by the first scan type of the registered scans of a plurality of sub-primal cuts and a second reference shape representing the second match characteristic by the second scan type of the registered scans of a plurality of sub-primal cuts.

For instance, an identification image generation engine 826 of the model generation computing device 806 may use one or more machine learning models stored in a model data store 838 to generate models as output based on images of a plurality of registered scans as input. The plurality of registered scans, which may be retrieved from an image/attribute data store 834 of the model generation computing device 806, can be used to create training data (stored in a training data store 836) to train the machine learning models to generate models for each type of sub-primal cut.

At block 1308, the identification image generation engine 826 of the model generation computing device 806 may also receive a plurality of identified attribute characteristics for each sub-primal cut of each of the registered scans. The plurality of identified attribute characteristics for each sub-primal cut of each of the registered scans may be stored and/or retrieved from the image/attribute data store 834 of the model generation computing device 806.

At block 1308, the identification image generation engine 826 of the model generation computing device 806 may use one or more machine learning models to generate a plurality of attribute characteristic value ranges for each model using the plurality of identified attribute characteristics for each sub-primal cut as input. The plurality of identified attribute characteristics for each sub-primal cut as input, which may be retrieved from an image/attribute data store 834 of the model generation computing device 806, can be used to create training data (stored in a training data store 836) to train the machine learning models to generate a plurality of attribute characteristic value ranges for each model for each type of sub-primal cut.

FIGS. 14A and 14B show a flowchart that illustrates a non-limiting example of a method 1400 for training one or more machine learning models to generate a plurality of models each associated with a type of sub-primal cut, which may be carried out by one or more engines of the model generation computing device 806. The method 1400 may be carried out to train one or more machine learning models to generate models for use by the optimization computing device 902 in identifying a type of sub-primal cut being conveyed along a conveyor of a processing system, such as processing system 804.

From a start block, the method 1400 proceeds to block 1304, where the identification image generation engine 826 of the model generation computing device 806 receives a first set of training data including registered scans of a plurality of sub-primal cuts, each of the registered scans including a first scan of a first scan type showing a first match characteristic for the sub-primal cut and a second scan of a second scan type showing a second match characteristic for the sub-primal cut. Each of the registered scans are associated with a type of sub-primal cut, such as the type assigned by the identification assembly 816. The registered scans may be stored and/or retrieved from the image/attribute data store 834 of the model generation computing device 806.

In some examples, the method 1400 may be used to train one or more machine learning models to generate a plurality of models each associated with a type of sub-primal cut, wherein the types of sub-primal cut are defined by at least one of consumer preferences, individual and packaged value of the sub-primal cuts, or other criteria. For instance, rather than associating each model with a type of sub-primal cut based on its cut location of the sub-primal cut (such as a chop location along a pork loin), the model for a type of sub-primal cut may be defined by characteristics in higher value categories of those sub-primal cuts. Data relevant to training the one or more machine learning models to generate a plurality of models for a type of sub-primal cut based on its higher value characteristics may be received from or retrieved from the finished workpiece supply/demand engine 832 of the workpiece utilization computing device 808.

At block 1406, the identification image generation engine 826 of the model generation computing device 806 adds the first set of training data for each type of sub-primal cut in a training data store 836 of the model generation computing device 806.

At block 1408, the identification image generation engine 826 of the model generation computing device 806 trains one or more machine learning models to generate a model for each type of sub-primal cut using information stored in the training data store 836 as input, wherein each model includes a first reference shape representing the first match characteristic by the first scan type of the registered scans of a plurality of sub-primal cuts and a second reference shape representing the second match characteristic by the second scan type of the registered scans of a plurality of sub-primal cuts.

At block 1410, the identification image generation engine 826 of the model generation computing device 806 stores the one or more machine learning models in the model data store 838 for later retrieval and use by the identification image generation engine 826 in generating a plurality of models, such as using the method 1302.

At block 1412, an attribute data generation engine 828 of the model generation computing device 806 may receive a second set of training data including a plurality of identified attribute characteristics for each sub-primal cut of each of the registered scans. The identified attribute characteristics for each sub-primal cut of each of the registered scans are associated with a type of sub-primal cut, such as the type assigned by the identification assembly 816 (and/or a type as identified by the finished workpiece supply/demand engine 832 of the workpiece utilization computing device 808). The attribute data may be stored and/or retrieved from the image/attribute data store 834 of the model generation computing device 806.

At block 1414, the attribute data generation engine 828 of the model generation computing device 806 adds the second set of training data for each type of sub-primal cut in the training data store 836.

At block 1416, the attribute data generation engine 828 of the model generation computing device trains one or more machine learning models to generate one or more attribute characteristic value ranges for each model for each type of sub-primal cut using information stored in the training data store 836.

At block 1418, the attribute data generation engine 828 of the model generation computing device 806 stores the one or more machine learning models in a model data store 838.

FIG. 15 shows a flowchart that illustrates a non-limiting example of a method 1500 for using one or more machine learning models to assign a type of sub-primal cut to a sub-primal cut, which may be carried out by one or more engines of the optimization computing device 902. The method 1500 may be carried out to use one or more machine learning models to identify a type of sub-primal cut for a sub-primal cut being conveyed along a conveyor of a processing system, such as processing system 804.

From a start block, the method 1500 proceeds to block 1502, where the classification engine 1016 of the optimization computing device 902 receives a registered scan of the sub-primal cut aligned with each one of a plurality of models (aligned with, for instance, one or more of the translation algorithms of the scanning data processing engine 1008 discussed above). Each of the aligned registered scan and models may be retrieved from the shape match/attribute data store 1020.

Each registered scan includes a first scan of a first scan type showing a first match characteristic and a second scan of a second scan type showing a second match characteristic. Each model is associated with a type of sub-primal cut, where each model includes at least a first reference shape for detection of a first match characteristic by a first scan type and a second reference shape for detection of a second match characteristic by a second scan type. Each model also includes one or more attribute characteristic value ranges, which may be retrieved from the shape match/attribute data store 1020.

At block 1506, the classification engine 1016 of the optimization computing device 902 receives a plurality of identified attribute characteristics for the sub-primal cut, which may be retrieved from the shape match/attribute data store 1020.

At block 1508, the classification engine 1016 of the optimization computing device 902 retrieves one or more machine learning models from the model data store 1024.

At block 1510, the classification engine 1016 of the optimization computing device 902, using the one or more retrieved machine learning models, processes the aligned registered scan, the plurality of models, and the plurality of identified attribute characteristics as input to assign a type of sub-primal cut to the sub-primal cut as output.

FIG. 16 is a flowchart that illustrates a non-limiting example of a method 1618 of packing food products such as sub-primal cuts. The method 1618 may be carried out for sub-primal cuts being conveyed along a conveyor of a processing system, such as processing system 804. The method 1618 may be carried out at least in part by one or more of the classification engine 1016 of the optimization computing device 902, the raw workpiece supply/demand engine 830 of the workpiece utilization computing device 808, and the finished workpiece supply/demand engine 832 of the workpiece utilization computing device 808.

From a start block, the method 1618 proceeds to block 1602, where a primal cut is portioned or sliced into a plurality of sub-primal cuts. For instance, the slicer 814 may be used to slice a primal cut into sub-primal cuts. In that regard, the slicer 814 may be located downstream from a cutter (not shown) used to cut a carcass into primal cuts. Also, the slicer 814 may be adjustable so that a desired thickness of each individual workpiece or sub-primal cut is obtained. Such adjustment may be under the control of the optimization computing device 902 based on data sent from the finished workpiece supply/demand engine 832 of the workpiece utilization computing device 808 regarding finished workpiece supply/demand requirements (e.g., there is a certain demand for ⅜" thick cuts v. 1" cuts, so the slicer is adjusted to meet the demand). In some examples, the primal cut is portioned or sliced into a plurality of sub-primal cuts before it reaches the conveyor 812 of processing system 804.

Steps of the method are carried out for a sub-primal beginning at block 1604 before proceeding to next sub-primal cut at block 1612. Blocks 1606, 1608, and 1610 of the method 1618 are carried out for a sub-primal cut beginning at block 1604 before proceeding to carry out the steps at blocks 1606, 1608, and 1610 for the next sub-primal cut at block 1612.

At block 1604, for each sub-primal cut, the processor(s) 1002 of the optimization computing device 902 receives a plurality of scans of the sub-primal cut from a plurality of scanning devices. For instance, the scanning data processing engine 1008 of the optimization computing device 902 may receive an X-ray scan of the sub-primal cut and an optical scan of the sub-primal cut.

At block 1608, the scanning data processing engine 1008 of the optimization computing device 902 matches or registers the plurality of scans of the sub-primal cut. For instance, the scanning data processing engine 1008 of the optimization computing device 902 aligns the X-ray scan of the sub-primal cut with the optical scan of the sub-primal cut using one or more of the techniques discussed above.

At block 1608, the optimization computing device 902 determines a type for the sub-primal cut, such as by carrying out method 1222 of FIG. 12.

At block 1614, the optimization computing device 902 performs a global optimization to assign each sub-primal cut to a package configuration based on the assigned type of sub-primal cut. The package configuration assigned to each type of sub-primal cut may be based on information pertaining to a supply of raw, incoming workpieces (transmitted, for instance, from the raw workpiece supply/demand engine 830 of the workpiece utilization computing device 808), requirements of finished workpieces (transmitted, for instance, from the finished workpiece supply/demand engine 832 of the workpiece utilization computing device 808), or other information from other sources. The finished workpiece data may identify at least one of a monetary value and a demand for each packaging configuration.

For instance, in some examples, a type of sub-primal cut, an identified attribute characteristic (e.g. spinalis of a certain size), a total or best model match score, etc., may be tied to a package identifier that designates use of any sub-primal cuts of those types, having those attribute characteristics, etc., to be used in a certain package configuration. For instance, if a scanned chopped is identified as having a spinalis that is greater than a certain size, it may be identified as being designated for a certain package configuration based on its higher value. In that regard, one or more machine learning models may be trained to identify a package configuration as output based on a type of sub-primal cut, identified attribute characteristics, a total or best model match score, etc., used as input. In that regard, performing the global optimization may include using one or more machine learning models to identify a package configuration for the sub-primal cut.

The package configurations may be designed based on information received from the finished workpiece supply/demand engine 832 of the workpiece utilization computing device 808 or other sources that identify various values for different types of sub-primal cuts and combinations of cuts. The information may be processed by the classification engine 1016 to identify a package configuration for each type of sub-primal cut.

In one example, a package may be configured as a "constant value pack", where each package totals a value, such as $20. Each constant value pack could include different numbers of sub-primal cuts of different values and weights, but totaling the designated value of $20. The optimization computing device 902 can determine, based on the designated value of $20 and the supply of raw, incoming workpieces, for instance, what quantity and/or type of sub-primal cut should be included in the constant value pack.

As another example, a package may be configured as a "constant value sub-primal cut pack," where each sub-primal cut is within a range of value (determined, for instance, based on its total or best model match score). For instance, if identified sub-primal cuts are within a value range of $1.90 to $2.10 (such as depending on size and type (quality)), the optimization computing device 902 may assign the sub-primal cuts to be included in the constant value sub-primal cut pack. The constant value sub-primal cut pack may be a valuable bulk pack for institutional or restaurant businesses that desire a consistent value for individual servings of sub-primal cuts.

As another example, a package may be configured as a designated nutritional package of sub-primal cuts, such as a package of sub-primal cuts having low fat, constant fat, a certain estimation of calories, etc.

As another example, the optimization computing device 902 may assign a workpiece to a non-package configuration based on workpiece being assigned as a non-sub-primal cut type workpiece (such as a blade chop, trim and/or end piece of the primal cut), as discussed above.

It should be appreciated that data pertaining to designation of the various package configurations to the different types of sub-primal cuts can be used to optimize other aspects of the processing system, such as the cutting, portioning, trimming, sorting, pick-up, etc. For instance, if a sub-primal cut is designated for a certain type of package, the optimization computing device 902 may send instructions to the portioner 818 to trim or portion the sub-primal cut according to the package requirements.

At block 1616, the optimization computing device 902 transmits instructions to a packaging system to package each of the sub-primal cuts in the package configuration as assigned by the global optimization. For instance, the optimization computing device 902 may transmit instructions to the packager 824 to package each of the identified sub-primal cuts in a designated package configuration.

Figure 17:
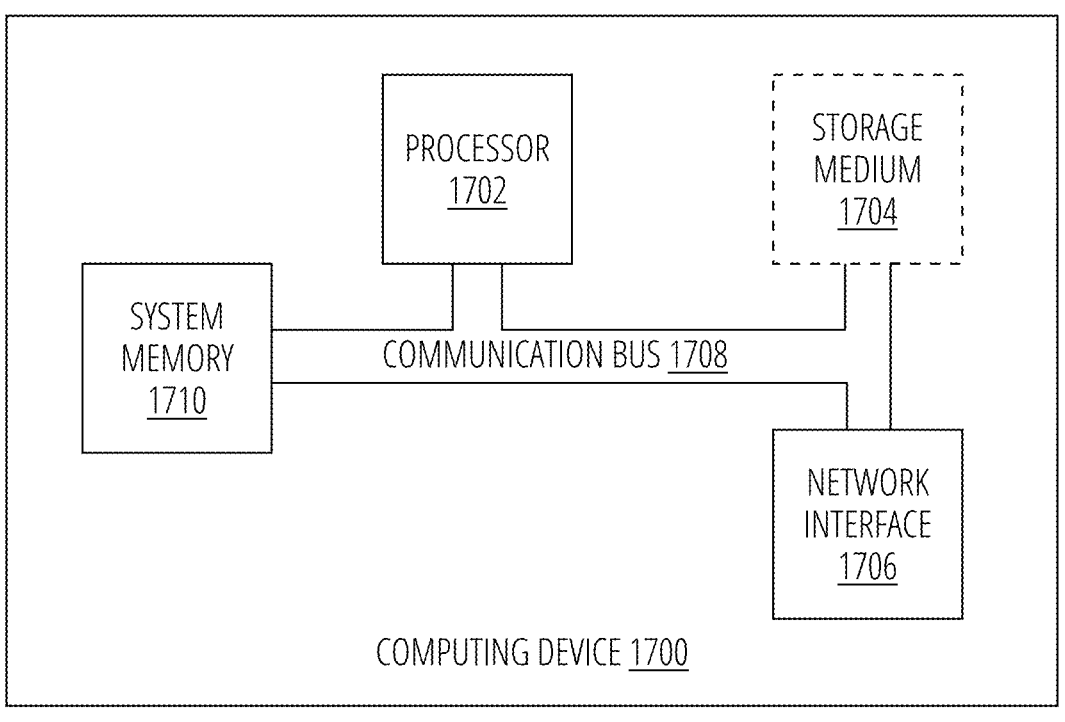
FIG. 17 shows a block diagram that illustrates a non-limiting example of a computing device appropriate for use as a computing device with examples of the present disclosure.

FIG. 17 is a block diagram that illustrates aspects of an exemplary computing device 1700 appropriate for use as a computing device of the present disclosure. While multiple different types of computing devices were discussed above, the exemplary computing device 1700 describes various elements that are common to many different types of computing devices. While FIG. 17 is described with reference to a computing device that is implemented as a device on a network, the description below is applicable to servers, personal computers, mobile phones, smart phones, tablet computers, embedded computing devices, and other devices that may be used to implement portions of examples of the present disclosure. Some examples of a computing device may be implemented in or may include an application-specific integrated circuit (ASIC), a field-programmable gate array (FPGA), or other customized device. Moreover, those of ordinary skill in the art and others will recognize that the computing device 1700 may be any one of any number of currently available or yet to be developed devices.

In its most basic configuration, the computing device 1700 includes at least one processor 1702 and a system memory 1710 connected by a communication bus 1708. Depending on the exact configuration and type of device, the system memory 1710 may be volatile or nonvolatile memory, such as read only memory ("ROM"), random access memory ("RAM"), EEPROM, flash memory, or similar memory technology. Those of ordinary skill in the art and others will recognize that system memory 1710 typically stores data and/or program modules that are immediately accessible to and/or currently being operated on by the processor 1702. In this regard, the processor 1702 may serve as a computational center of the computing device 1700 by supporting the execution of instructions.

As further illustrated in FIG. 17, the computing device 1700 may include a network interface 1706 comprising one or more components for communicating with other devices over a network. Examples of the present disclosure may access basic services that utilize the network interface 1706 to perform communications using common network protocols. The network interface 1706 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 1706 illustrated in FIG. 17 may represent one or more wireless interfaces or physical communication interfaces described and illustrated above with respect to particular components of the computing device 1700.

In the example depicted in FIG. 17, the computing device 1700 also includes a storage medium 1704. However, services may be accessed using a computing device that does not include means for persisting data to a local storage medium. Therefore, the storage medium 1704 depicted in FIG. 17 is represented with a dashed line to indicate that the storage medium 1704 is optional. In any event, the storage medium 1704 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 1702, system memory 1710, communication bus 1708, storage medium 1704, and network interface 1706 are known and commercially available. For ease of illustration and because it is not important for an understanding of the claimed subject matter, FIG. 17 does not show some of the typical components of many computing devices. In this regard, the computing device 1700 may include input devices, such as a keyboard, keypad, mouse, microphone, touch input device, touch screen, tablet, and/or the like. Such input devices may be coupled to the computing device 1700 by wired or wireless connections including RF, infrared, serial, parallel, Bluetooth, Bluetooth low energy, USB, or other suitable connections protocols using wireless or physical connections. Similarly, the computing device 1700 may also include output devices such as a display, speakers, printer, etc. Since these devices are well known in the art, they are not illustrated or described further herein.

While the concepts of the present disclosure are susceptible to various modifications and alternative forms, specific examples thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one example," "an example," "an example," etc., indicate that the example described may include a particular feature, structure, or characteristic, but every example may or may not necessarily include that particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "up", "down", "left", "right", "first", "second", etc., in the present disclosure is meant to provide orientation for the reader with reference to the drawings and is not intended to be the required orientation of the components or graphical images or to impart orientation limitations into the claims.

In the drawings, some structural or method features may be shown in specific arrangements and/or orderings. However, it should be appreciated that such specific arrangements and/or orderings may not be required. Rather, in some examples, such features may be arranged in a different manner and/or order than shown in the illustrative figures. Additionally, the inclusion of a structural or method feature in a particular figure is not meant to imply that such feature is required in all examples and, in some examples, it may not be included or may be combined with other features.

As used herein, the terms "about", "approximately," etc., in reference to a number, is used herein to include numbers that fall within a range of 10%, 5%, or 1% in either direction (greater than or less than) the number unless otherwise stated or otherwise evident from the context (except where such number would exceed 100% of a possible value).

Where electronic or software components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Headings of sections provided in this patent application and the title of this patent application are for convenience only and are not to be taken as limiting the disclosure in any way.

While illustrative examples have been illustrated and described, it will be appreciated that various changes can be made therein without departing from the spirit and scope of the invention.

The examples of the invention in which an exclusive property or privilege is claimed are defined as follows:

1. A computer-implemented method of optimizing processing of a sub-primal cut, the method comprising:
   receiving, by an optimization computing device, a plurality of models, wherein each model is associated with a type of sub-primal cut, wherein each model includes at least a first reference shape for detection of a first match characteristic by a first scan type and a second reference shape for detection of a second match characteristic by a second scan type, and wherein each model includes a plurality of attribute characteristic value ranges;
   receiving, by the optimization computing device, a registered scan of a sub-primal cut including a first scan of the first scan type showing the first match characteristic and a second scan of the second scan type showing the second match characteristic;
   identifying, by the optimization computing device, a plurality of attribute characteristics for the sub-primal cut using at least one of the first and second scan types of the registered scan;
   for each model of the plurality of models:
      concurrently aligning the first reference shape of the model to the first match characteristic of the first scan type and the second reference shape of the model to the second match characteristic of the second scan type; and
      calculating a plurality of shape match values based on the alignment of the first and second match characteristics with the first and second reference shapes;
      calculating a plurality of attribute match values based on the identified plurality of attribute characteristics compared to the attribute characteristic value ranges;
   determining a best model match for the registered scan using the plurality of attribute match values and the plurality of shape match values; and
   assigning a type of sub-primal cut to the sub-primal cut based on the best model match.

2. The computer-implemented method of claim 1, further comprising:
   assigning the sub-primal cut to at least one of a package configuration and a non-package configuration based on the assigned type of sub-primal cut; and
   using the assigned type of sub-primal cut in a global optimization for a plurality of sub-primal cuts and a plurality of package configurations, wherein global optimization includes:
   receiving raw workpiece data that identifies a supply of a first assigned type of sub-primal cut and a supply of a second assigned type of sub-primal cut;
   receiving finished workpiece data that identifies a first packaging configuration having at least one of the first and second assigned types of sub-primal cut and a second packaging configuration having at least one of the first and second assigned types of sub-primal cut.

3. The computer-implemented method of claim 1, wherein the first scan type is an X-ray scan and the second scan type is an optical image, and wherein the first reference shape indicates an expected shape of one or more bones and wherein the second reference shape indicates an expected shape of a lean protein area.

4. The computer-implemented method of claim 1, further comprising assigning a weight to matching of the first reference shape to the first match characteristic that is greater than a weight assigned to matching of the second reference shape to the second match characteristic for calculating the plurality of match shape values.

5. The computer-implemented method of claim 1, wherein the attribute characteristics include at least one of entire object outline, length, width, height, weight, points, area, percentage of fat v. lean, concavity, flatness, roundness, bone quantity, bone area, bone length, bone edge offset, blood spots, holes, bruises, parasites, and bone to meat ratio.

6. The computer-implemented method of claim 1, wherein the shape match values include a measurement of overlap of each reference shape of the model to a corresponding match characteristics in the registered scan.

7. The computer-implemented method of claim 1, further comprising calculating the plurality of shape match values each time at least one of the reference shapes of the model and the registered scan is translated to align the first and second reference shapes of the model to the first and second match characteristics of the registered scan.

8. The computer-implemented method of claim 1, wherein concurrently aligning the first reference shape of the model to the first match characteristic and the second reference shape of the model to the second match characteristic includes at least one of directional translation of at least one of the model and the reference scan, rotational translation of at least one of the model and the reference scan, scaling the size of at least one of the model and the reference scan, and shear distortion of at least one of the model and the reference scan.

9. The computer-implemented method of claim 1, wherein concurrently aligning the first reference shape of the model to the first match characteristic and the second reference shape of the model to the second match characteristic includes at least one of performing a point-to-point distance reducing process and minimizing an area difference between the first and second reference shapes of the model and corresponding first and second match characteristic of the reference scan.

10. The computer-implemented method of claim 1, wherein the attribute match values are based on at least one of whether measured properties of each of the identified plurality of attribute falls within a corresponding attribute characteristic value range, deviation of measured properties of each of the identified plurality of attribute characteristics from the corresponding attribute characteristic value range, deviation of measured properties of each of the identified plurality of attribute characteristics from at least one of a corresponding average attribute characteristic value and a corresponding median attribute characteristic value, and a weight assigned to one or more attribute characteristics.

11. The computer-implemented method of claim 1, further comprising, for each model of the plurality of models:
aligning an outline reference shape of the model to an outline match characteristic of the registered scan; and
calculating a plurality of shape match values based on the alignment of the outline reference shape of the model to an outline match characteristic of the registered scan.

12. The computer-implemented method of claim 1, wherein a registered scan of a sub-primal cut is defined by:
comparing portions of a first data set of the first scan with portions of a second data set of the second scan; and
optionally performing translations of the first data set onto the second data set.

13. The computer-implemented method of claim 12, further comprising:
measuring an input product parameter of the sub-primal cut using at least one of the first scan of the first scan type, the second scan of the second scan type, and the registered scan of the sub-primal cut; and
at least one of sorting, diverting, and removing the sub-primal cut if the measured input product parameter is outside a predetermined range.

14. The computer-implemented method of claim 13, further comprising:
sending data from the optimization computing device to at least one processing module pertaining to the assigned type of sub-primal cut; and
performing, with the at least one processing module, at least one of cutting, portioning, and trimming the sub-primal cut based on its assigned type of sub-primal cut.

15. The computer-implemented method of claim 1, wherein each of the models include at least one region of interest (ROI) associated with at least one of a match characteristic and an attribute characteristic, and wherein the computer-implemented method further includes identifying, by the optimization computing device, at least one attribute characteristic for the sub-primal cut using an ROI associated with the attribute characteristic.

16. The computer-implemented method of claim 1, further comprising assigning a first type of sub-primal cut to the sub-primal cut based on at least one of the plurality of attribute match values and the plurality of shape match values being within a predetermined threshold value of at least one of the plurality of attribute match values and the plurality of shape match values of a second type of sub-primal cut when a demand for the first type of sub-primal cut is greater than a demand for the second type of sub-primal cut.

17. The computer-implemented method of claim 1, further comprising using one or more machine learning models to generate the plurality of models each associated with a type of sub-primal cut, comprising:
receiving, by a model generation computing device, registered scans of a plurality of sub-primal cuts, each of the registered scans including a first scan of the first scan type showing the first match characteristic for the sub-primal cut and a second scan of the second scan type showing the second match characteristic for the sub-primal cut; and
generating a model for each type of sub-primal cut using the registered scans as input, each model including a first reference shape representing the first match characteristic by the first scan type of the registered scans of a plurality of sub-primal cuts and a second reference shape representing the second match characteristic by the second scan type of the registered scans of a plurality of sub-primal cuts.

18. The computer-implemented method of claim 17, further comprising training the one or more machine learning models by:
receiving, by a model generation computing device, a first set of training data including registered scans of a plurality of sub-primal cuts, each of the registered scans including a first scan of the first scan type showing the first match characteristic for the sub-primal cut and a second scan of the second scan type showing the second match characteristic for the sub-primal cut and each of the registered scans associated with a type of sub-primal cut;

adding, by the model generation computing device, the first set of training data for each type of sub-primal cut in a training data store;

training, by the model generation computing device, the machine learning model to generate a model for each type of sub-primal cut using information stored in the training data store as input, each model including a first reference shape representing the first match characteristic by the first scan type of the registered scans of a plurality of sub-primal cuts and a second reference shape representing the second match characteristic by the second scan type of the registered scans of a plurality of sub-primal cuts; and storing, by the model generation computing device, the one or more machine learning models in a model data store.

19. The computer-implemented method of claim 17, further comprising:

receiving, by the model generation computing device, a plurality of identified attribute characteristics for each sub-primal cut of each of the registered scans; and generating a plurality of attribute characteristic value ranges for each model using the plurality of identified attribute characteristics for each sub-primal cut as input.

20. The computer-implemented method of claim 19, further comprising training the one or more machine learning models by:

receiving, by the model generation computing device, a second set of training data including a plurality of identified attribute characteristics for the sub-primal cut of each of the registered scans;

adding, by the model generation computing device, the second set of training data for each type of sub-primal cut in a training data store;

training, by the model generation computing device, one or more machine learning models to generate one or more attribute characteristic value ranges for each model for each type of sub-primal cut using information stored in the training data stores; and storing, by the model generation computing device, the one or more machine learning models in a model data store.

\* \* \* \* \*